United States Patent
Cheim

(10) Patent No.: US 11,719,760 B2
(45) Date of Patent: Aug. 8, 2023

(54) PROBABILISTIC DETERMINATION OF TRANSFORMER END OF LIFE

(71) Applicant: HITACHI ENERGY SWITZERLAND AG, Baden (CH)

(72) Inventor: Luiz Cheim, Raleigh, NC (US)

(73) Assignee: Hitachi Energy Switzerland AG, Baden (CH)

( * ) Notice: Subject to any disclaimer, the term of this patent is extended or adjusted under 35 U.S.C. 154(b) by 559 days.

(21) Appl. No.: 16/843,684

(22) Filed: Apr. 8, 2020

(65) Prior Publication Data

US 2021/0318391 A1 Oct. 14, 2021

(51) Int. Cl.
```
G01R 31/62      (2020.01)
G06F 30/3308    (2020.01)
G06F 119/04     (2020.01)
G06F 119/08     (2020.01)
G06F 111/08     (2020.01)
```

(52) U.S. Cl.
CPC ......... *G01R 31/62* (2020.01); *G06F 30/3308* (2020.01); *G06F 2111/08* (2020.01); *G06F 2119/04* (2020.01); *G06F 2119/08* (2020.01)

(58) Field of Classification Search
CPC ... G01R 31/62; G06F 2111/08; G06F 2119/04
See application file for complete search history.

(56) References Cited

U.S. PATENT DOCUMENTS

| | | | | |
|---|---|---|---|---|
| 10,281,338 | B2* | 5/2019 | Feng | H02H 7/04 |
| 2006/0259277 | A1* | 11/2006 | Fantana | G06Q 10/10 |
| | | | | 702/183 |
| 2007/0050302 | A1* | 3/2007 | Cheim | G06Q 30/02 |
| | | | | 705/63 |
| 2016/0003884 | A1* | 1/2016 | Lee | G01K 7/427 |
| | | | | 702/34 |
| 2018/0003759 | A1* | 1/2018 | Bhattacharya | G01R 31/003 |

FOREIGN PATENT DOCUMENTS

| | | |
|---|---|---|
| CN | 105244873 A | 1/2016 |
| CN | 108802584 A | 11/2018 |

OTHER PUBLICATIONS

Sen, P.K. et. al, "Transformer Overloading and Assessment of Loss-of-Life for Liquid-Filled Transformers,—Final Project Report," Power Systems Engineering Research Center (PSERC) Publication 11-02, Feb. 2011, 121 pages.

(Continued)

*Primary Examiner* — Jack Chiang
*Assistant Examiner* — Brandon Bowers
(74) *Attorney, Agent, or Firm* — Sage Patent Group

(57) ABSTRACT

A method of estimating future aging of a transformer includes generating probabilistic models of factors that affect effective aging of the transformer, generating probabilistic profiles of the factors that affect effective aging of the transformer based on the probabilistic models, generating expected hot spot profiles from the probabilistic profiles, simulating a plurality of aging scenarios of the transformer based on the expected hot spot profiles and ambient temperature profiles, and estimating future aging of the transformer from the plurality of aging scenarios.

28 Claims, 19 Drawing Sheets

(56) References Cited

OTHER PUBLICATIONS

Djamali, Mohammad et al., A New Top-Oil Temperature Model based on IEC 60076-7 for OFAF and ONAF Transformer, Diagnostik Elektrischer Betriebsmittel, Conference Paper, Nov. 25-26, 2014, Berlin, 7 pages.
IEEE Power and Energy Society, "IEEE Guide for Loading Mineral-Oil-Immersed Transformers and Step-Voltage Regulators," IEEE Std C57.91-2011 (revision of IEEE Std C57.91-1995), 120 pages.
IEC, International Standard, "Power transformers—Part 7: Loading guide for oil-immersed power transformers," IEC 60076-7, Edition 1.0, Dec. 2005, 118 pages.
International Search Report and Written Opinion of the International Searching Authority, PCT/EP2021/059234, dated Jul. 19, 2021, 20 pages.
Ossman, Wilbur R. et al., "Substation Expansion, Reliability, and Transformer Loading Policy Analysis," IEEE Transactions on Power Apparatus and Systems, vol. 82, No. 8, Aug. 1969, 11 pages.
Chiodo, Elio et al., "Lifetime characterization via lognormal distribution of transformers in smart grids: Design optimization," Applied Energy, vol. 177, 2016, pp. 127-135.
Peterchuck, Doug et al., "Sensitivity of Transformer's Hottest-Spot and Equivalent Aging to Selected Parameters," IEEE Transactions on Power Delivery, vol. 17, No. 4, Oct. 2002, 6 pages.
Bracale, Antonio et al, "A Probalistic Approach for Forecasting the Allowable Current of Oil-Immersed Transformers," IEEE Transactions on Power Delivery, vol. 33, No. 4, Aug. 2018, 10 pages.

* cited by examiner

PROBABILISTIC DETERMINATION OF TRANSFORMER END OF LIFE

BACKGROUND

The present disclosure relates to analysis of high voltage transformers. In particular, the present disclosure relates to systems and methods for estimating future aging of high voltage transformers.

High voltage transformers, such as those used in electrical substations, are complex and expensive items. There is great interest among manufacturers and owners of such transformers in being able to accurately estimate the remaining operating life of a transformer. Transformer manufacturers typically state a nominal expected operating life for new transformers. For example, a typical new high voltage transformer may be rated by its manufacturer to have a nominal lifetime of 180,000 hours, or about 20 years. Such ratings are based on use at a nominal ambient temperature and nominal operating load, and are typically calculated using a formula according to the IEC 60076-7 standard that takes into account the nominal ambient temperature as well as the top oil temperature of the transformer at the nominal load.

However, the actual ambient temperature and operating load at which a transformer is operated varies daily and seasonally, and both quantities may exceed their nominal values from time to time depending on how and where the transformer is operated. Thus, the rating provided by the manufacturer is a rough estimate at best of the actual life of a transformer.

Moreover, the actual life of a transformer is affected by other factors, most notably, the moisture and oxygen content within the transformer. High voltage transformers are filled with oil, such as mineral oil, that acts as a coolant and/or an insulator, and protects solid insulation within the transformer, e.g., cellulose or paper, from chemical attack. The presence of moisture and/or oxygen in the oil can impair these functions, resulting in shortening of the transformer life.

Other factors that can affect life of a transformer include maintenance, oil leakage, internal oil channel blockage, environmental impacts (lightning, storms, etc.), physical displacement, and others.

SUMMARY

A method of estimating future aging of a transformer includes generating probabilistic models of factors that affect effective aging of the transformer, generating a plurality of probabilistic profiles of the factors that affect effective aging of the transformer based on the probabilistic models, generating expected hot spot profiles from the probabilistic profiles, simulating a plurality of future aging scenarios of the transformer based on the expected hot spot profiles, and estimating an expected remaining life of the transformer from the plurality of future aging scenarios.

In some embodiments, the plurality of probabilistic profiles are generated for a first time period, and the future aging scenarios are generated over a second time period that is different from the first time period. The first time period may be a 24 hour time period, and the second time period may be a one year time period.

In some embodiments, the factors affecting the effective aging of the transformer may include load conditions, ambient temperature, moisture levels inside the transformer and oxygen levels inside the transformer.

In some embodiments, simulating the plurality of future aging scenarios includes performing a Monte Carlo simulation of future aging scenarios.

In some embodiments, simulating the plurality of aging scenarios includes generating a plurality of aging profiles that simulate aging of the transformer over the first time period, for each of the plurality of aging profiles, estimating an effective aging amount of the transformer to provide a plurality of effective aging amounts, and summing the plurality of effective aging amounts to provide an estimated effective aging amount over the second time period.

In some embodiments, generating probabilistic profiles of factors that affect the effective aging of the transformer includes generating a plurality of ambient temperature profiles based on historical variations in ambient temperature.

In some embodiments, the ambient temperature profiles describe expected ambient temperatures over the course of a predetermined time period.

Some embodiments further include generating the ambient temperature profiles based on probability distributions at a plurality of time intervals within the predetermined time period. In some embodiments, the probability distributions include uniform probability distributions.

In some embodiments, generating probabilistic profiles of factors that affect the effective aging of the transformer includes generating a plurality of expected load profiles based on predicted loading of the transformer.

In some embodiments, the expected load profiles describe expected loads over the course of a predetermined time period.

In some embodiments, the method further includes generating the expected load profiles based on probability distributions at a plurality of time intervals within the predetermined time period. In some embodiments, the probability distributions include uniform probability distributions.

In some embodiments, estimating the remaining life of the transformer from the plurality of future life scenarios includes generating a histogram of expected aging scenarios, and generating a confidence interval of an expected remaining life of the transformer based on the histogram of expected aging scenarios.

In some embodiments, the aging scenarios include expected annual aging scenarios, and the expected remaining life of the transformer is estimated based on a nominal expected life of the transformer and the expected annual aging scenarios.

In some embodiments, the method includes collecting operational data representing factors that affect effective aging of the transformer during operation of the transformer, and updating the probabilistic models of the factors that affect effective aging of the transformer.

In some embodiments, the method includes determining an effective current age of the transformer based on the operational data, wherein the expected remaining life of the transformer is estimated from the plurality of future aging scenarios, from the effective current age of the transformer and a nominal expected life of the transformer.

In some embodiments, the method further includes performing maintenance on the transformer and/or adjusting a load of the transformer based on the estimated future aging of the transformer.

A method of operating a transformer based on probabilistic models of factors that affect aging of the transformer according to some embodiments includes collecting operational data representing the factors that affect effective aging of the transformer during operation of the transformer, updating the probabilistic models of the factors that affect effective aging of the transformer based on the operational data, and determining an effective current age of the transformer based on the operational data, The expected remaining life of the transformer is estimated from the plurality of future aging scenarios generated based on the probabilistic factors, from the effective current age of the transformer and a nominal expected life of the transformer.

In some embodiments, collecting the operational data includes collecting the operational data from a sensor in the transformer.

A device for generating an expected remaining life of a transformer includes a processing circuit, and a memory coupled to the processing circuit. The memory stores computer program instructions that, when executed by the processing circuit, cause the device to perform operations including generating probabilistic models of factors that affect effective aging of the transformer, generating expected hot spot profiles from the probabilistic models, simulating a plurality of future aging scenarios of the transformer based on the expected hot spot profiles, and estimating an expected remaining life of the transformer from the plurality of future aging scenarios.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
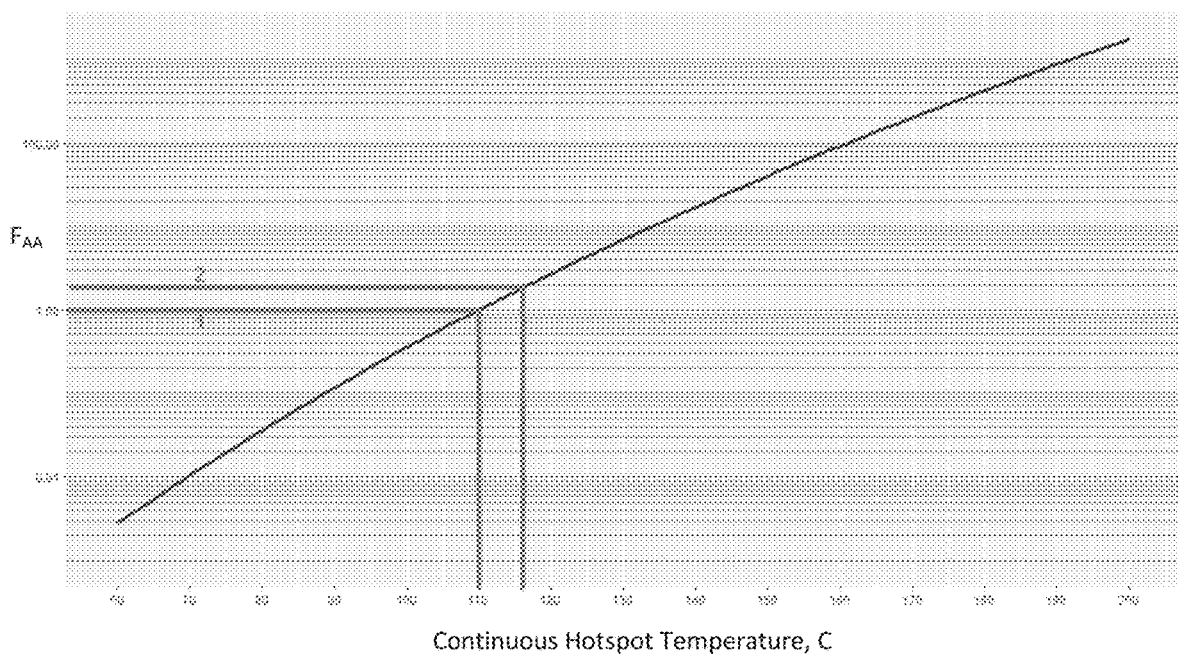
FIG. 1 is a graph illustrating the effect of changes in hot spot temperature on the aging acceleration factor for transformers including thermally upgraded paper.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

It is typically accepted that the hot spot temperature of a transformer is the dominant factor that affects aging of the transformer. The hot spot temperature refers to the hottest temperature in the transformer. Typically, the hot spot temperature of a transformer is not measured directly, but is estimated using a thermal model adapted according to the design of the transformer (for e.g. insulation used, cooling arrangement of the transformer etc.) and with ambient temperature and electrical load data. The hot spot temperature and its variation over time depends on the onsite geographical location of the transformer (ambient temperature) and the electrical load on the transformer. Thus, the hot spot temperature value is a characteristic value for the transformer being dependent on the ambient conditions (temperature and load) and design of the transformer. The nominal operating life of a transformer is typically calculated according to the formulas set out in the IEC 60076-7

IEEE C57.19 Loading Guide using the hot spot temperature value. As an example, for a constant hot spot temperature of 110° C., the per-unit end of life of a transformer can be estimated according to Equation [1] as:

$$\text{Per Unit Life} = 9.8 \times 10^{-18} e^{\left[\frac{15000}{\Theta H + 273}\right]} \quad [1]$$

where θH is the hot spot temperature of the transformer. Thus, for a constant hot spot temperature of 110° C. using thermally upgraded paper as an insulation in the transformer (e.g. of design of the transformer), the transformer has an estimated per unit (normalized) life of 1.0. For a transformer rated at 180,000 hours, this means that the transformer will have an expected life of 180,000 hours if operated at a constant hot spot temperature of 110° C. at its rated load.

The aging of a transformer can be accelerated or delayed depending on whether the transformer is operated at a temperature above or below the nominal hot spot temperature. To account for this, the IEC 60076-7 and IEEE C57.91 standard also specifies a formula for estimating an aging acceleration factor, $F_{AA}$, based on the estimated hot spot temperature, given as Equation [2]:

$$F_{AA} = e^{\left[\frac{15000}{383} - \frac{15000}{\Theta H + 273}\right]} \quad [2]$$

As can be seen in Equation [2], when the transformer is operated at hot spot temperatures above 110° C., the argument of the exponential function is positive, meaning that the aging acceleration factor $F_{AA}$ is greater than one (indicating accelerated aging), while when the transformer is operated at hot spot temperatures below 110° C., the argument of the exponential function is negative, meaning that the aging acceleration factor $F_{AA}$ is less than one (indicating reduced aging). The actual aging can then be estimated by multiplying the per unit life of the transformer by the aging acceleration factor. The effect of changes in hot spot temperature on the aging acceleration factor $F_{AA}$ for transformers including thermally upgraded paper is illustrated in FIG. 1. As seen therein, an increase in the hot spot temperature from 110° C. to 116° C. results in a doubling of the aging acceleration factor $F_{AA}$ from 1 to about 2, meaning that the transformer is expected to age about twice as fast when operated at a hot spot temperature of 116° C. as it would if operated at a hot spot temperature of 110° C.

From the graph of FIG. 1, it can be seen that a variation in hot spot temperature of +/−6° C. can cause the aging acceleration factor $F_{AA}$ to vary from about 0.5 to about 2, meaning that the actual aging rate of the transformer can vary from about 50% of the nominal rate up to about 200% of the nominal rate based on fairly small hot spot temperature variations.

The estimate of hot spot temperature can be subject to various inaccuracies. For example, the location at which the hot spot is estimated can be inaccurate leading to inaccurate estimation of hot spot, the sensors used to measure temperatures within the transformer (e.g. top oil temperature) can have some inaccuracies and whether the hot spot is estimated continuously or intermittently can all affect the measurement results. These inaccuracies can affect the aging estimate of the transformer.

According to the IEC 60076-7 and IEEE C57.91 standards, the hot spot temperature is assumed to consist of three components as shown in equation [3]:

$$\Theta_H = \Theta_A + \Delta\Theta_{TO} + \Delta\Theta_H \quad [3]$$

where $\theta_H$ is the winding hottest spot temperature, $\theta_A$ is the average ambient temperature during the load cycle to be studied, $\Delta\theta_{TO}$ is the top-oil rise over ambient temperature, and $\Delta\theta_H$ is the winding hottest-spot rise over top-oil temperature. The top-oil temperature is given by equation [4]:

$$\Theta_{TO} = \Theta_A + \Delta\Theta_{TO} \quad [4]$$

Transient winding hottest-spot temperature is given by equation [5]:

$$\Delta\Theta_H = (\Delta\Theta_{H,U} - \Delta\Theta_{H,i})\left(1 - e^{-\frac{t}{\tau_w}}\right) + \Delta\Theta_{H,i} \quad [5]$$

where t is the duration of load, $\Delta\theta_{H,U}$ is the ultimate winding hottest-spot rise over top-oil temperature for load L, $\Delta\theta_{H,i}$ is the initial winding hottest-spot rise over top-oil temperature for t=0, and $\tau_W$ is the winding time constant at hot spot location h.

Figure 2:
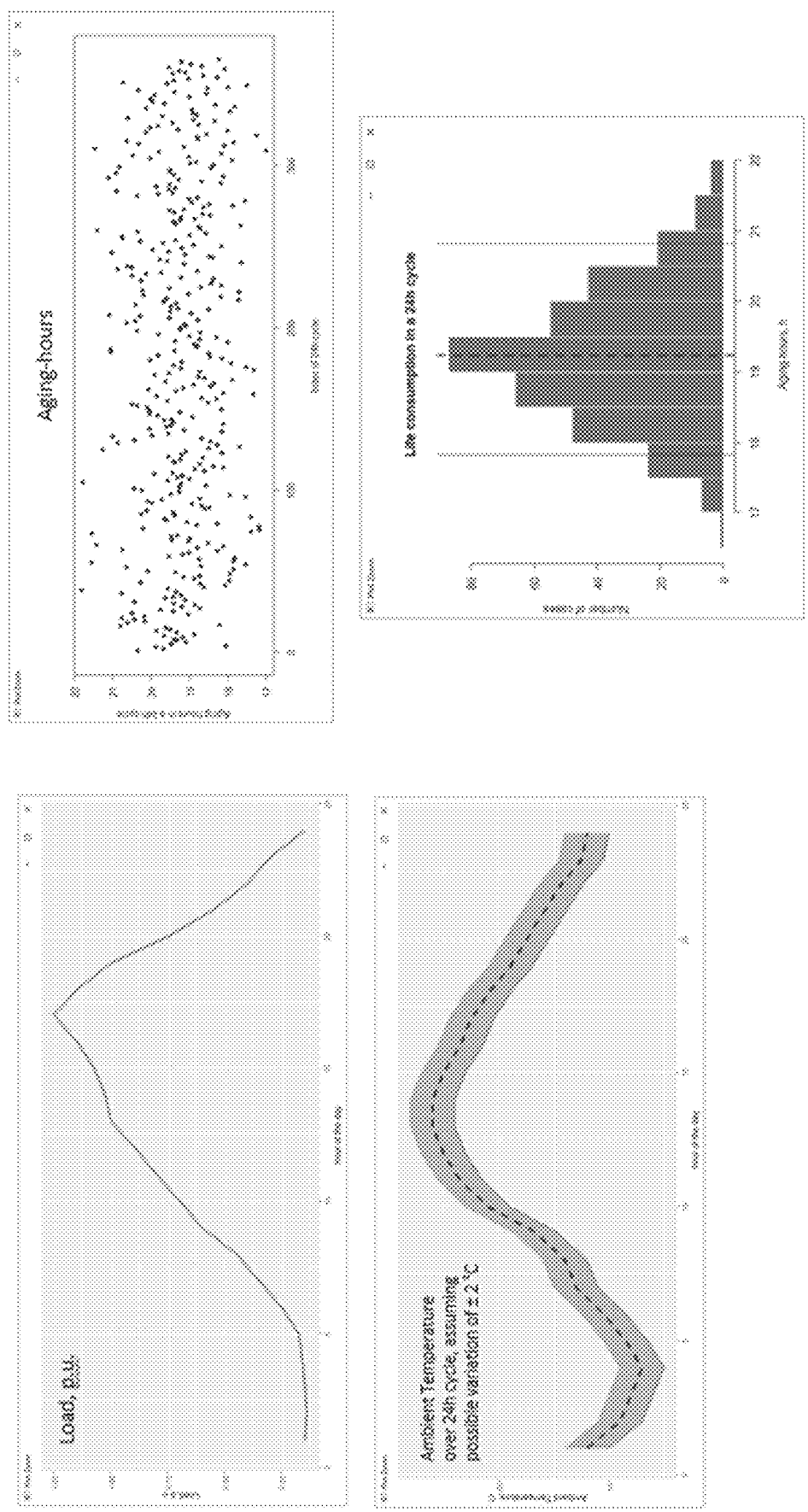
FIG. 2 is a graph illustrating the effect of a +/−2% error in ambient temperature on the aging hours of a transformer.

In this model, errors in the ambient temperature measurement/estimate can affect the hot spot temperature calculation, which in turn affects the aging acceleration factor of the transformer. For example, FIG. 2 illustrates the effect of a +/−2% error in ambient temperature on the aging hours of a transformer given an operating load profile as shown. In the example shown in FIG. 2, the aging of a transformer within a single 2-hour period may vary by up to about +/−2.5 hours based on the variation in ambient temperature.

As noted above, the actual aging of a transformer can be affected by many factors in addition to the hot spot temperature, including ambient temperature, moisture content, oxygen content, operating load and other factors. Given this complexity, the industry-accepted aging models based on thermal performance using deterministic load and ambient temperature factors have limited accuracy. Accordingly, there currently exist problems in the art, such as how to accurately estimate future aging of a transformer so that an expected end-of-life of the transformer can be accurately determined. A related problem is how to incorporate multiple factors that affect aging of a transformer into the estimate of future aging.

Some embodiments described herein provide systems/methods that estimate the expected future aging of a transformer based on probabilistic models of various factors that affect transformer aging, including operating load and ambient temperature of the transformers. Some further embodiments provide systems/methods that estimate the expected future aging of a transformer based on probabilistic models of moisture content and oxygen content within the transformer in addition to operating load and ambient temperature of the transformers. Still further embodiments adapt aging estimates of a transformer based on particular characteristics of the transformer (design characteristics, geographical location characteristics, history data related to usage of the transformer, etc.).

Some embodiments take into account probabilistic models of the factors affecting transformer aging rather than relying on the previously used deterministic models. The probabilistic models may be adapted using actual operating history data of the transformer. These approaches may provide estimates of remaining life of that are more accurate for a given transformer than the deterministic models.

The probabilistic approach described herein is used to account for the fact that the actual load and ambient temperatures that the transformer will be subjected to in the future are not known. The probabilistic approach described herein replaces the "unknown" deterministic values of load and ambient (past and future) by their most likely probabilistic values (based on probability distribution functions that better represent their variation) and apply Monte Carlo simulation to simulate a large number of those scenarios. From the simulation results, it is possible to obtain an estimate of the cumulative aging (past and future) that will be represented by the resulting "normal distribution" of aging hours.

Figure 3A:
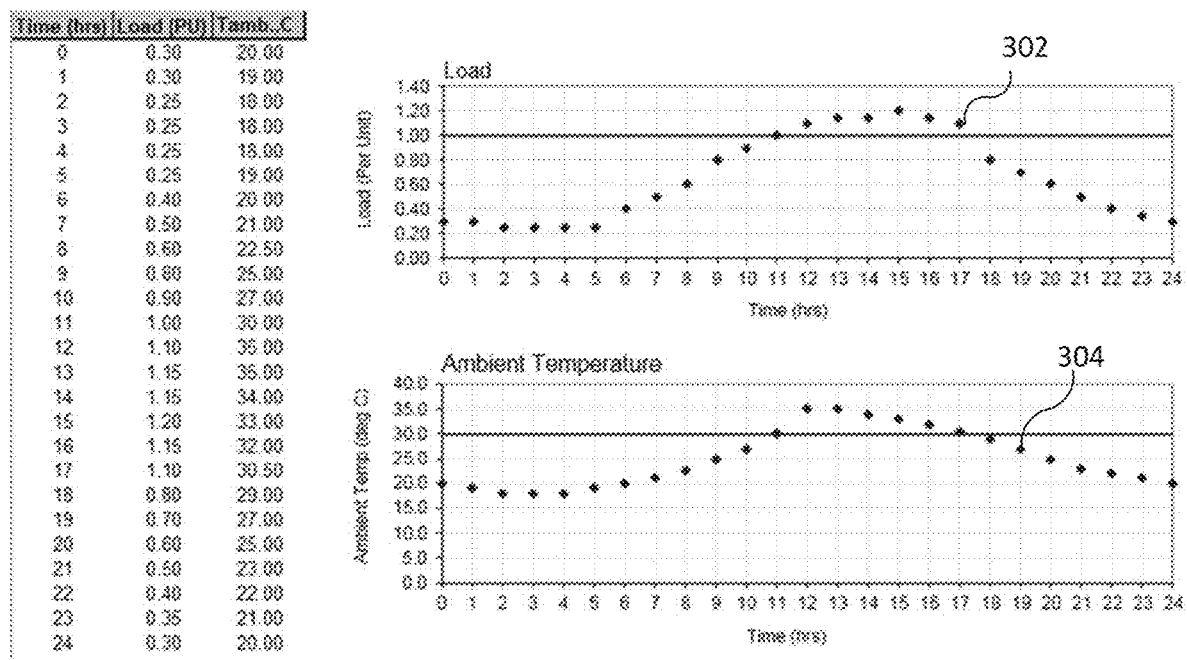
FIGS. 3A to 3C are graphs that illustrate calculation of the equivalent aging hours for a transformer over a 24-hour period using load and ambient temperature data.
Figure 3B:
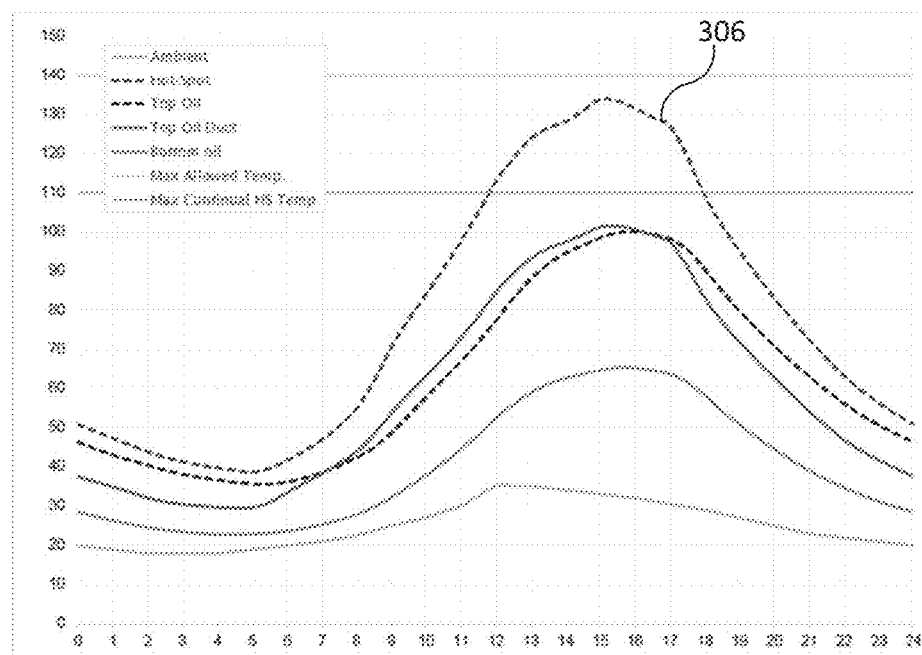
Figure 3C:
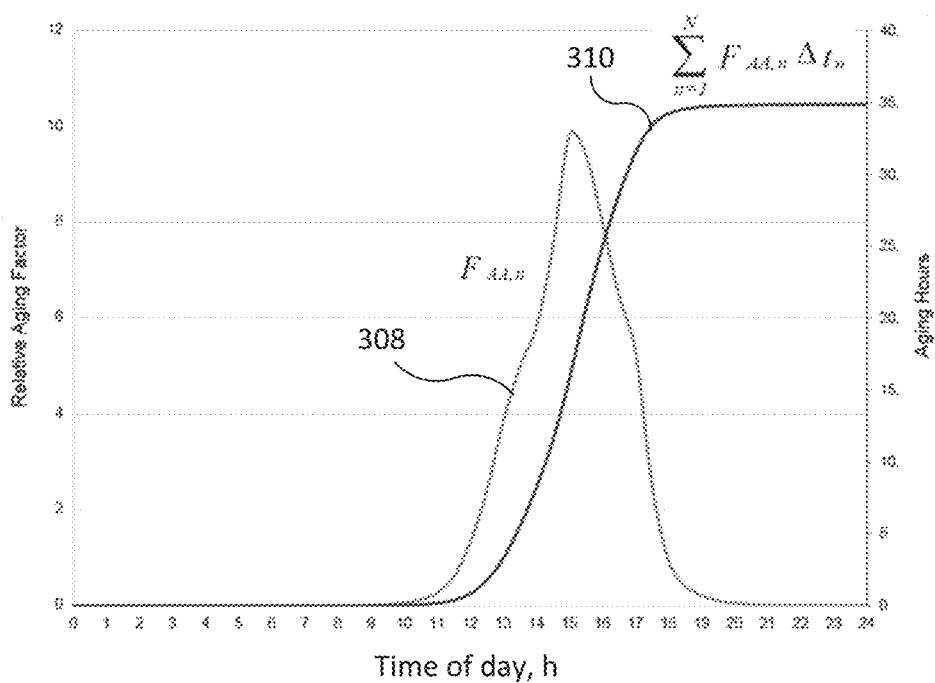

FIGS. 3A to 3C illustrate calculation of the equivalent aging hours for a transformer over an exemplary 24-hour period (first time period) using load and ambient temperature data. In particular FIG. 3A is a graph of hourly load 302 and ambient temperature 304 data for a transformer. Note that the load profile shown in FIG. 3A is given in per unit, or normalized, terms, such that the nominal load is represented as a load of 1.0. FIG. 3B is a graph of the hot spot temperature (curve 306) calculated according to a temperature model for the transformer in question that is based on the load and ambient temperature data shown in FIG. 3A.

FIG. 3C is a graph of the aging acceleration factor $F_{AA}$ (curve 308) for the transformer over the course of the 24-hour period that is calculated based on the hot spot temperature curve shown in FIG. 3B. Integrating the aging acceleration factor $F_{AA}$ curve yields the equivalent aging hours for the transformer over the 24-hour period, shown as curve 310. As seen in FIG. 3C, given the hot spot temperature curve shown in FIG. 3B that is based on the ambient temperature and load profiles shown in FIG. 3A, the transformer is expected to cumulative 'age' to about 35 ageing hours (also referred as effective aging) over the 24-hour period.

Figure 4:
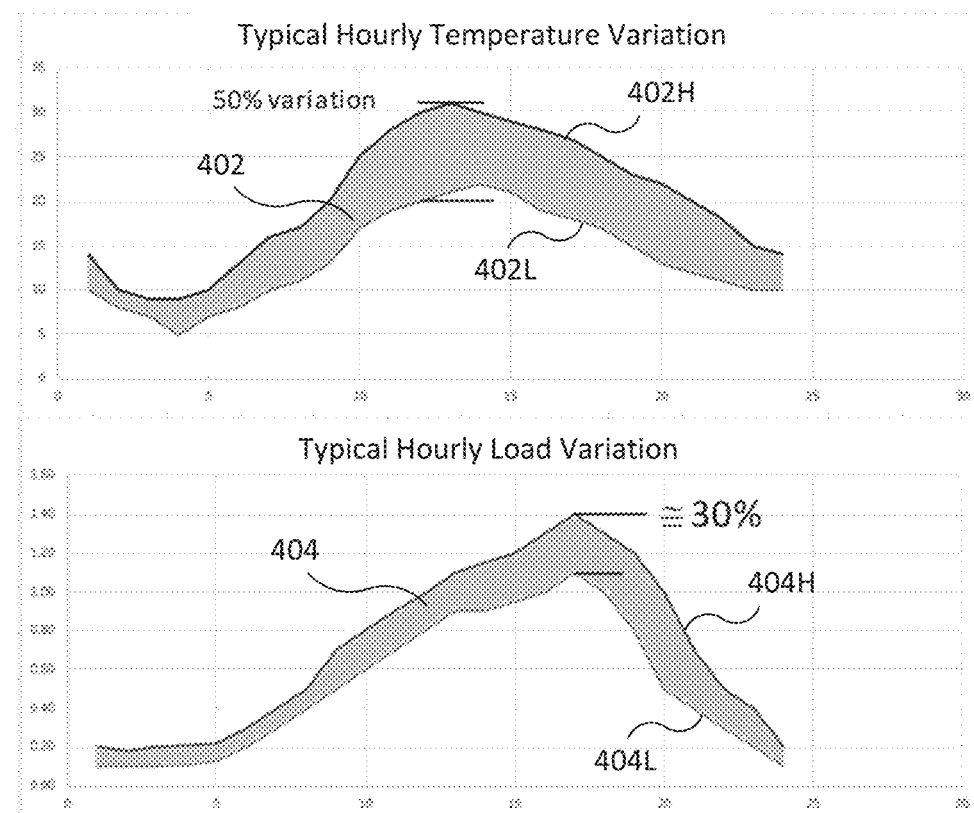
FIG. 4 is a graph that illustrates an example of hourly variation in temperature (402) and load (404) profiles for a representative transformer.

It will be appreciated that the load and ambient temperature profiles for a given transformer are variable. FIG. 4 illustrates an example of a profile 402 of hourly variation in temperature and a profile 404 of hourly variation in load for a representative transformer over a 24 hour period resulting from accumulation of data collected over a long period (e.g. years). The variation of temperature for each time interval can be bounded by a high boundary 402H and a low boundary 402L at each time interval, and the variation in load for each time interval is bounded by a high boundary 404H and a low boundary 404L at each time interval. Thus, for example for the temperature profile 402 shown in FIG. 4, at hour 10 the temperature may fall somewhere between about 10° C. and 25° C. Similarly, for the load profile 404 shown in FIG. 4, at hour 10 the temperature may fall somewhere between about 0.6 and 0.8.

In the illustrative example shown in FIG. 4, there is a variation in ambient temperature of up to 50% and a variation in load of up to 30%. For purposes of analysis, it is assumed that the ambient temperature profile and load profile for a transformer are known and/or can be estimated by considering a suitable lower and upper boundaries (limits) for each instant of time over the first time period. For example, the first time period data may be hourly, daily, weekly, monthly, quarterly, or yearly time period and can be used accordingly with variations observed over long period at similar/corresponding instant of time. It will be appreciated that the profiles shown in FIG. 4 are for a given 24 hour period, and that the profile will typically vary throughout a given year due to seasonal changes in ambient temperature and/or load requirements, resulting in variations in the ambient temperature/load value at a particular instant of time when data is organized over the first time period (in this example, 24 hour period).

In some embodiments, load, ambient temperature, and/or other data may be collected for the transformer using a transformer monitoring system. A transformer monitoring system can function to detect transformer faults and provide data collection functionality for transformer condition assessment. A transformer monitoring system may be capable of monitoring of temperatures and currents in the transformer, and thereby determine the hot spot temperature and electric load on the transformer for ageing and life assessment of the transformer. The transformer monitoring system may calculate hot-spot temperatures according to IEC and/or IEEE standards and use such data to model thermal behavior, allowing comparison between measured and expected readings and provide prognostic services such as estimation of future life of the transformer. Services from the transformer monitoring system may be provided as part of a transformer or as advanced transformer services enabled with a remote transformer monitoring system (can be provided as a device or as a software solution provided on a digital system) that monitors the transformer using sensors within and around the transformer to measure transformer and ambience related parameters, and also have information for adapting a probabilistic model to represent the transformer being monitored (including its ambience). Output of a transformer monitoring system may be monitored locally (at the transformer site) and/or remotely (other than the transformer site) via a network interface. The transformer monitoring system can be used to monitor several transformers and assess their ageing/remnant life using the method described herein. Some embodiments described herein may be performed by a transformer monitoring system.

In particular, a transformer monitoring system according to some embodiments may generate a prediction of future aging of a transformer, including a prediction of the end-of-life of the transformer, based on various transformer related parameters, such as ambient temperature, load on the transformer, moisture content, oxygen content, etc. The predicted aging and/or end-of-life of the transformer may be used to schedule transformer maintenance, to plan/adjust loading of the transformer, provide advance warning of failure, and/or for other purposes related with asset management. A transformer monitoring system according to some embodiments is described in more detail below with reference to FIGS. 20A and 20B.

Transformer related parameters, for example load on the transformer, and ambient temperature data for the transformer can be obtained by the transformer monitoring system from measurements made in the transformer/at the transformer site. Measurement of the transformer related parameters including that of moisture content, dissolved oxygen content and other parameters useful for diagnosis of the transformer/life assessment of the transformer can be made with sensors mounted in the transformer. Such data can be stored by the transformer monitoring system (history data for the monitored transformer) and can be used to generate predictions of transformer related parameters, for example future load and ambient temperature for the transformer. Ambient temperature data can also be gathered from a weather tool for a given geographical location based on the site information associated with the transformer by the transformer monitoring system, and used in assessment if ambient data is not gathered through measurement at the site of the transformer. As discussed in more detail below, to effectively capture observable variations in the data, probabilistic daily profiles of load/ambient temperature can be generated through Monte Carlo simulation or other statistical techniques, and such profiles can be used to calculate annual aging estimates and life assessment. A plurality of annual aging estimates may be generated through Monte Carlo simulation. Such estimates can be analyzed to determine an expected annual aging of the transformer.

Figure 5:
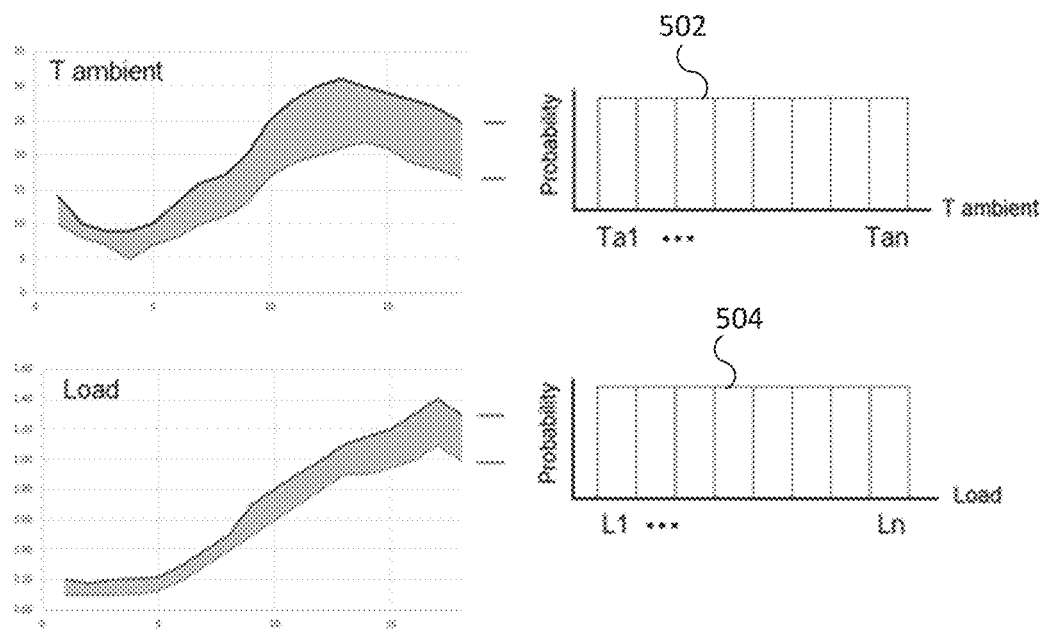
FIG. 5 illustrates probability distributions for ambient temperature variation and load variation that may be used in some embodiments to estimate remaining life of a transformer.

FIG. 5 shows uniform probability distributions for ambient temperature variation (502) and load variation (504) that may be used in some embodiments to predict future aging/estimate remaining life of a transformer. As shown in FIG. 5, for purposes of estimation, it can be assumed in some embodiments that the variation in load and ambient temperature is uniformly distributed between the upper and lower bounds in any given time interval. It will be appreciated that a different daily temperature distribution may be used in some embodiments. Daily maximum and minimum temperatures may be readily available for a given geographic location. Such information can be used to model daily temperature variations using a uniform probability distribution.

However, a transformer monitoring system can monitor ambient temperature and generate a more accurate probability distribution of daily temperatures for the transformer. That is, a transformer monitoring system can use the acquired ambient temperature data from the onsite transformer as historical data and generate a probability distribution of ambient temperature based on historical data gathered for a particular time duration (day/months/year). Thereby, such probability distributions of ambient temperature may be more representative of the actual temperature conditions and temperature variations based on the time of the day and season than a uniform probability distribution.

For example, the actual probability distribution of daily temperature variation may be found to follow a normal distribution, log-normal distribution or other probability distribution and these can be used for further assessment instead of a uniform distribution. It is presently believed that a uniform distribution is a conservative choice for modeling temperature variation for purposes of predicting/estimating transformer aging, and in some embodiments, the method is illustrated through use of uniform probability distributions within the measured/expected limits (bounds) of the transformer parameters (e.g. ambient temperature and load).

Figure 6:
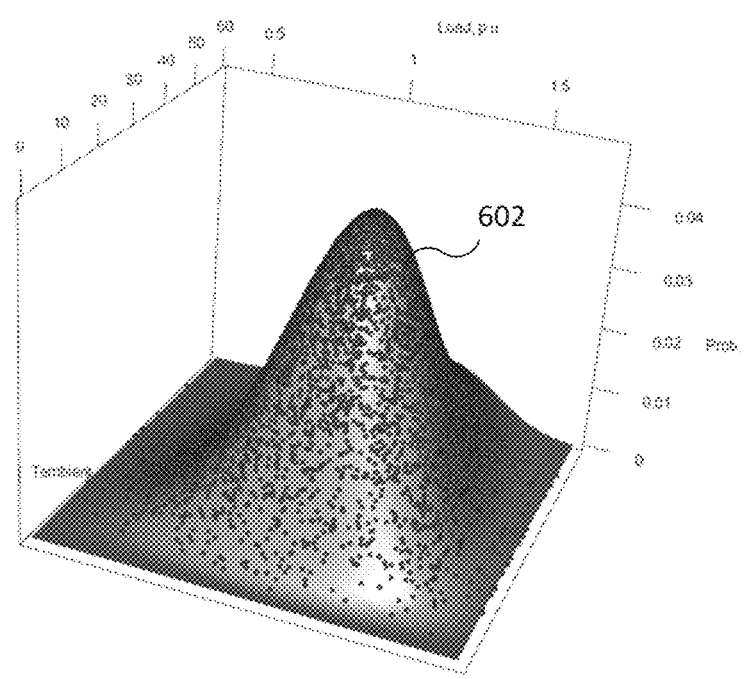
FIG. 6 is a three-dimensional probability density function for a combination of load and ambient temperature in a given time period.

Based on these assumptions, a probabilistic model of load and ambient temperature may be generated for a given time period. The probabilistic model may provide a three-dimensional probability density function for the combination of load and ambient temperature in a given time period, such as the three-dimensional probability density function 602 shown in FIG. 6.

In some embodiments, it is assumed that oil temperature is the primary aging factor for a transformer, i.e., that moisture and oxygen content do not materially contribute to aging, and that the transformer is using thermally upgraded paper.

Figure 7A:
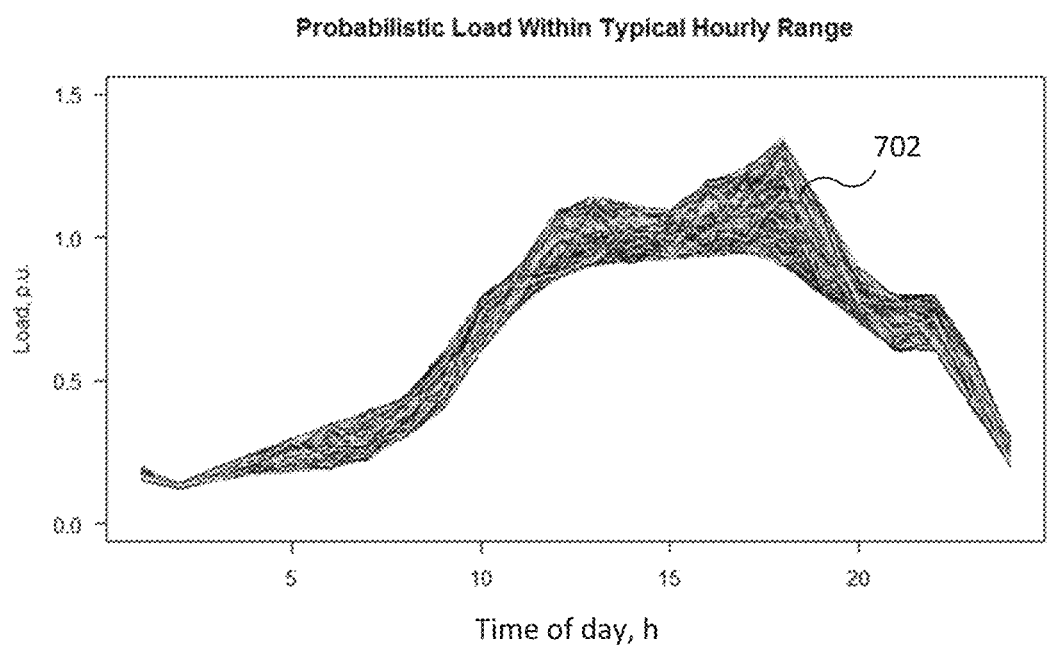
FIG. 7A is a graph of load profiles for a transformer generated through Monte Carlo simulation.
Figure 7B:
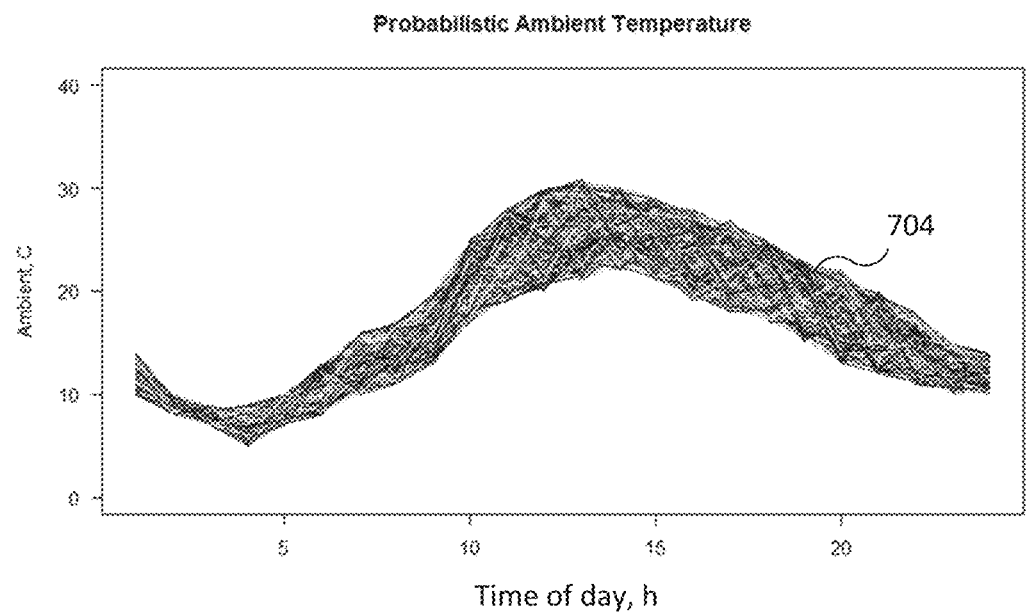
FIG. 7B is a graph of ambient temperature profiles for a transformer generated through Monte Carlo simulation.

Based on these assumptions, a plurality of potential load-ambient temperature profiles may be generated for a given period (first time period), such as a 24-hour period, using Monte Carlo simulation to capture possible variations in the load-ambient temperature profiles. Examples of resulting load and ambient temperature profiles 702, 704 are illustrated in FIGS. 7A and 7B, respectively. The load and ambient temperature profiles are example of profiles (also referred as probabilistic profiles) for the factors affecting ageing generated based on the probabilistic model (probability density functions created from available measured/obtained data). Many different possible profiles for load and ambient temperature are shown in FIGS. 7A and 7B.

The load and ambient temperature profiles shown in FIGS. 7A and 7B are generated based on the assumption that, at any given hour, load may vary with a probability based on the load probability distribution observed for the given hour, and ambient temperature may vary with a probability based on the ambient temperature probability distribution observed for the given hour. That is, as an example for a uniform load probability distribution (assumed), at any given hour, any load value within the range (from minimum to maximum) is equally likely to occur. Likewise, for a uniform temperature probability distribution, at any given hour, any ambient temperature within the range is equally likely to occur. As mentioned earlier, the transformer monitoring system can make use of the observed load and temperature probability distributions at any given hour (time) derived from the stored history data for computing the load and ambient temperature profiles shown in FIGS. 7A and 7B and make use of Monte Carlo simulation technique to consider statistical variations in load and ambient temperatures for the future to provide a more robust and accurate prediction of remnant life of the transformer.

Figure 8A:
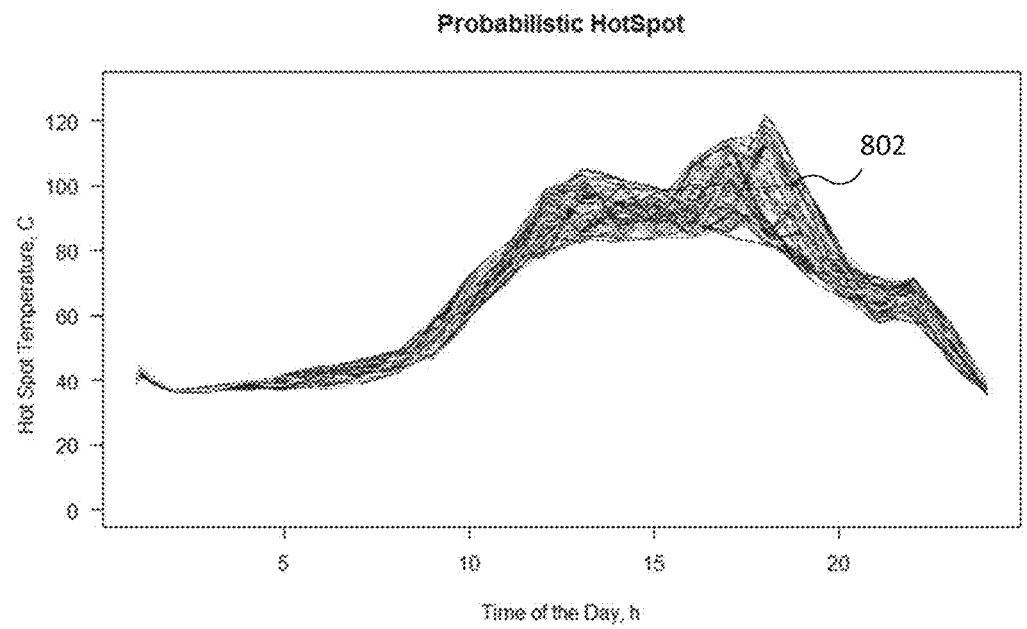
FIG. 8A illustrates probabilistic hot spot profiles generated using the load and ambient temperature profiles of FIGS. 7A and 7B.

Next, for each probabilistic scenario such as those shown in FIGS. 7A and 7B, a corresponding hot spot profile is calculated, resulting in the plurality of probabilistic hot spot profiles 802 shown in FIG. 8A. That is, for each load and ambient temperature profile generated by Monte Carlo simulation, a probabilistic hot spot profile containing hot spot values for each time instant is generated. The probabilistic hot spot profile is based on the temperature measurements made in the transformer (ambient temperature, top oil temperature etc.) and calculated using a hot spot model that may be unique to a transformer or transformer design in question (adaptation of a generic model), the uniqueness is captured with various constants such as the oil temperature constant, the winding temperature constant, the rated hot spot gradient, the rated oil rise, and other parameters that constitute hot spot temperature characteristics of the transformer in question.

Figure 8B:
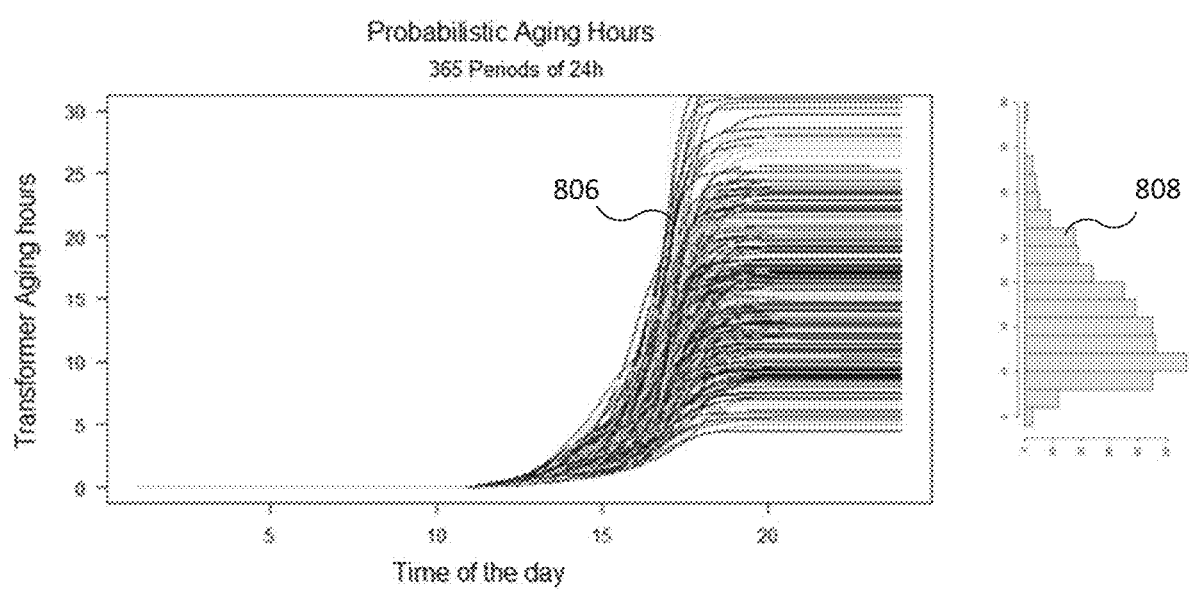
FIG. 8B illustrates probabilistic aging profiles generated using the probabilistic hot spot profiles of FIG. 8A.

Next, for each probabilistic hot spot profile, a corresponding probabilistic aging hour profile is generated for each day of the year (365 days) by calculating and integrating the corresponding aging acceleration $F_{AA}$ curve obtained for a day (24 hr period). The resulting probabilistic aging hour profiles 806 (referred also as effective aging profiles) are shown in FIG. 8B along with a histogram 808 of the total effective aging hour values for the 24-hour period. As can be seen in FIG. 8B, in this example, based on probabilistically generated temperature and load profiles, the effective aging hour of the transformer over a 24 hour period varies from about 5 hours to about 31 hours.

Thus, these estimated aging hours for multiple simulated 24-hour cycles may be summed to determine a total number of effective aging hours in a year to estimate cumulative aging for the transformer. For example, in one simulation, the transformer is predicted to have a total number of aging-hours in a one year period of 5785. This means that in the one-year period (equal to 8760 hours), the transformer is expected to effectively age only 5785 hours.

Figure 9:
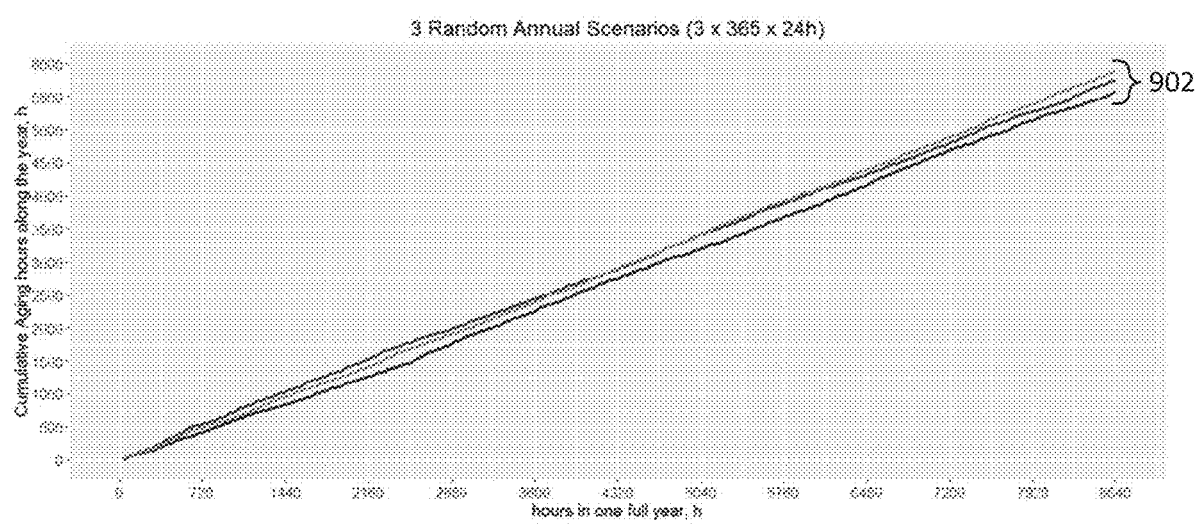
FIG. 9 illustrates cumulative aging for three separate 365 day aging simulations.

FIG. 9 illustrates future aging scenarios for three separate 365 day aging hour simulations 902. As can be seen in FIG. 9, the simulations estimate similar cumulative aging hour of about 5700 hours over the course of one year, and thus constitute annual aging scenarios. Accordingly, future aging scenarios are probabilistic scenarios that estimate future aging of the transformer over a given period of time based on randomly selected transformer aging factors, such as ambient temperature and load.

Figure 10:
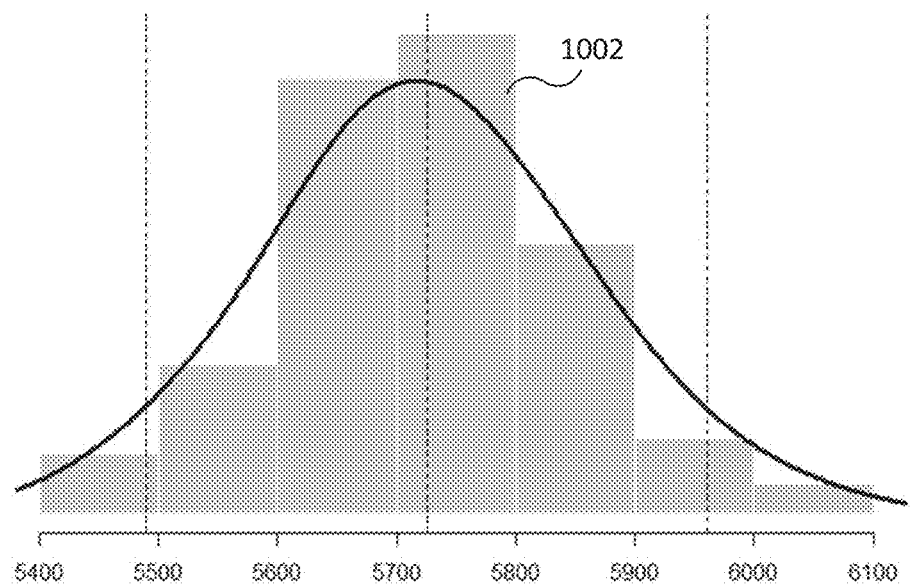
FIG. 10 illustrates a histogram of one-year aging profiles.

The one-year expected effective aging for multiple probabilistic aging hour profiles shown in FIG. 8B is illustrated in the histogram 1002 shown in FIG. 10. As indicated in FIG. 10, the distribution can be approximated as a normal distribution with a peak just above 5700 hours. From this data, the mean and standard deviation of the expected number of effective yearly aging hours can be calculated for the transformer. The approximation to a normal distribution is made according to the Central Limit Theorem, thereby having the sum of the distributions of multiple aging periods (say, 365×24 h cycles) resulting in a normal distribution for which the mean and the standard deviation can be calculated, irrespective of the original probability density functions that represent the components that lead to the calculated aging (i.e., the statistical distribution of hourly load and statistical distribution of hourly ambient temperature). Hence, due to the Central Limit Theorem, it is possible to use the calculations associated with a normal distribution to determine a 95% confidence interval for the expected number of effective aging hours in a year based on this information. In particular, the 95% confidence interval is calculated according to Equation [6] as:

$$95\% \text{ C.I.} = \text{mean} \pm 1.96 \times \sigma / \sqrt{n} \quad [6]$$

where n is the number of samples, mean is the sample mean, and σ is the sample standard deviation.

Figure 11:
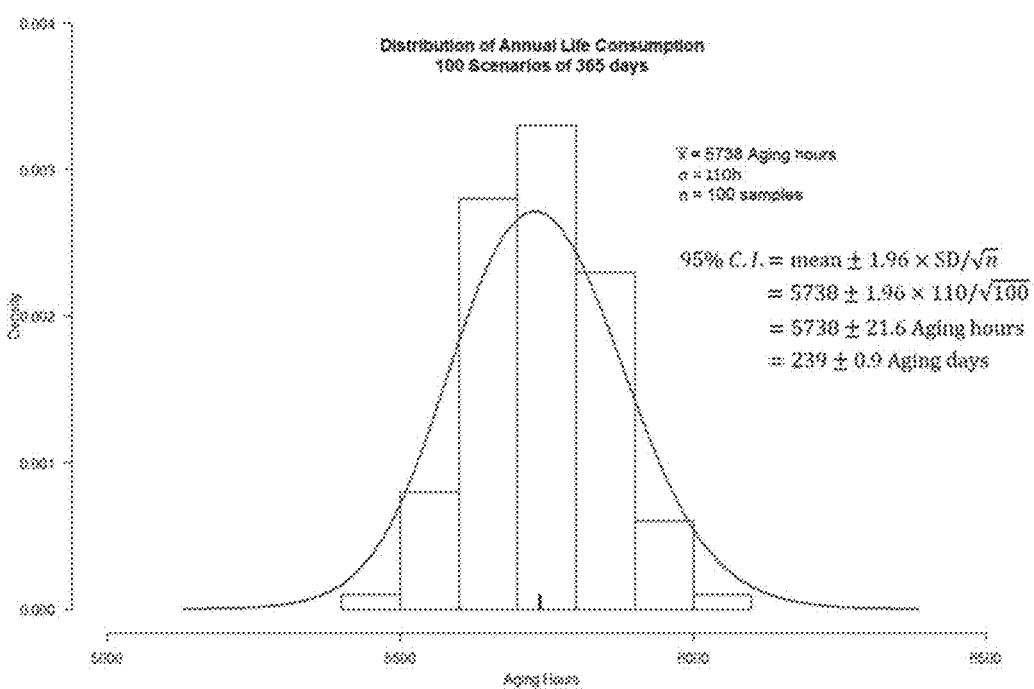
FIG. 11 illustrates a probability distribution of annual life consumption for a transformer.

For example, as shown in FIG. 11, in one example, the mean is 5738 hours and the standard deviation (σ) is 110 hours for 100 samples. Thus, the 95% confidence interval for aging in that case is 5738±21.6 effective aging hours or 239±0.9 effective aging days. Considering a nominal expected life of 180,000 hours, this means that the transformer in question is expected to have an actual operating life of 180,000/5738=31.4 years.

Figure 12:
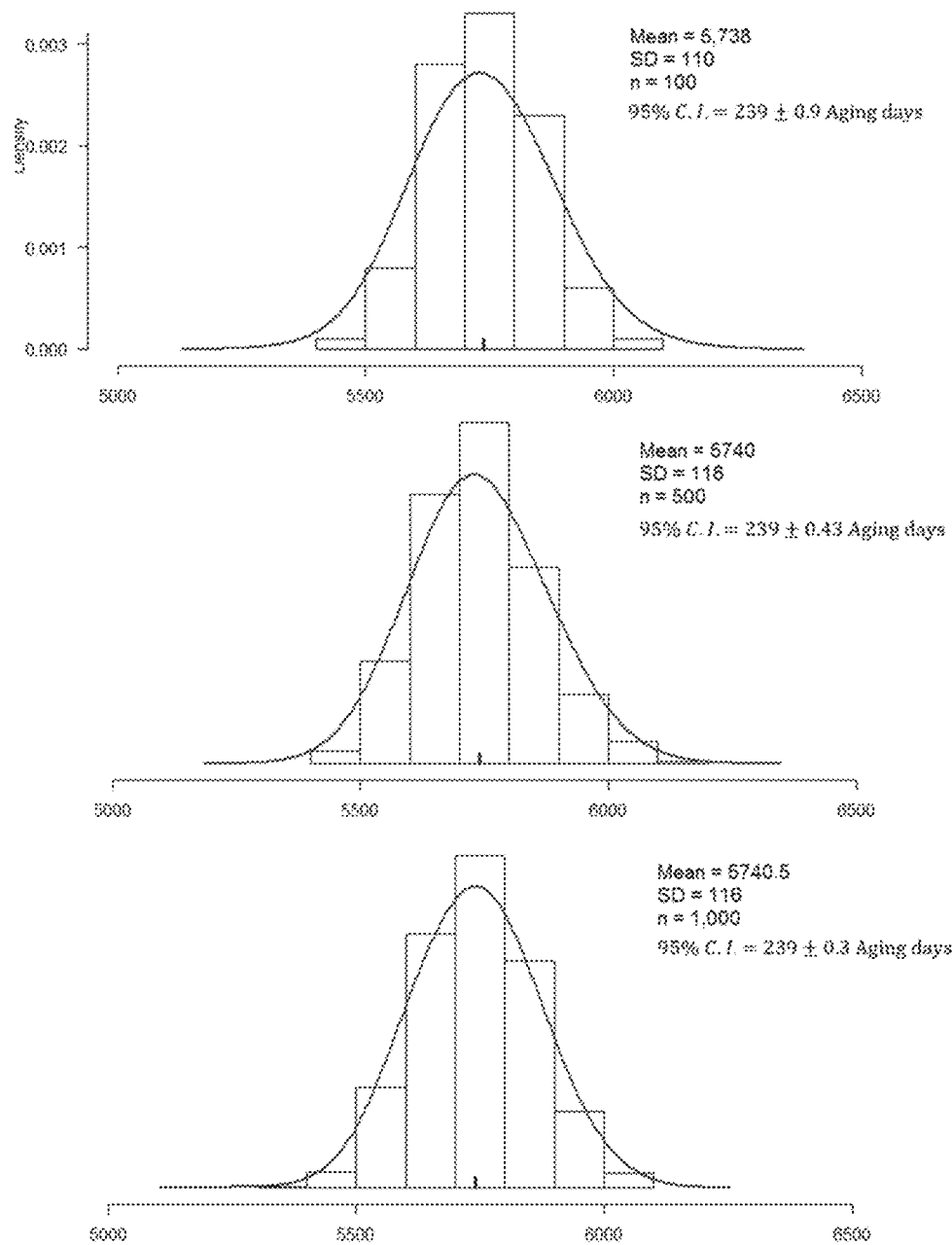
FIG. 12 illustrates examples of simulation results with increasing sample sizes (n).

FIG. 12 illustrates examples with increasing sample sizes (n), i.e., with increasing numbers of simulations. FIG. 12(a) shows the distribution of effective annual aging hours for a simulation with n=100, FIG. 12(b) shows the distribution of effective annual aging hours for a simulation with n=500, and FIG. 12(c) shows the distribution of effective annual aging hours for a simulation with n=1000. As can be seen, the mean and standard deviation change only very slightly as the number of simulations is increased.

Figure 13A:
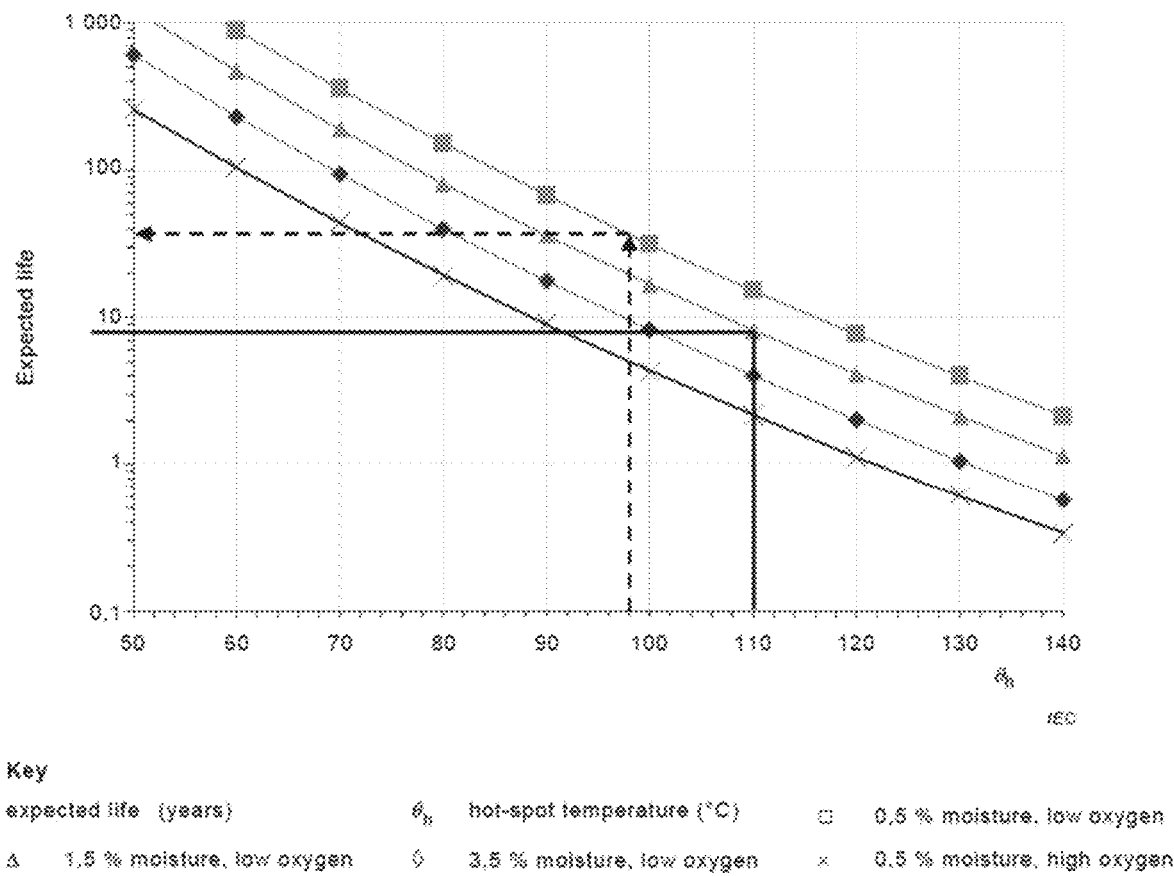
FIG. 13A is a graph from IEC 60076-7 of expected life of a transformer as a function of hot spot temperature for various moisture and oxygen levels for thermally upgraded paper.

As noted above, the effective aging of a transformer may also be affected by the presence of moisture and/or oxygen within the transformer, as the presence of oxygen and/or moisture can affect the performance of the solid insulation in the transformer. FIG. 13A is a graph from IEC 60076-7 of expected life of a transformer as a function of hot spot temperature for various moisture and oxygen levels for thermally upgraded paper. As can be seen in FIG. 13A, the expected life curve shifts downward as oxygen and moisture content increase, resulting in shorter life, with the presence of oxygen having a stronger negative effect on life. The graphs in FIG. 13A are generated by application of the Arrhenius equation with the parameters of environment factor (A) and activation energy $E_A$ being chosen based on the moisture and oxygen levels. Equation [7], from IEC 60076-7, shows the equation used to generate the graphs in FIG. 13, and Table 1 shows the parameter used.

$$t_{exp} = \frac{\frac{1}{DP_{end}} - \frac{1}{DP_{start}}}{A \times 24 \times 365} \times e^{\frac{E_A}{R \times (\theta_h + 273)}} \text{ (years)} \quad [7]$$

TABLE 1

Activation Energy ($E_A$) and Environment Factor (A) for Oxidation, Hydrolysis

| | | ageing parameters | | | |
|---|---|---|---|---|---|
| Paper type | | Free from air and 0.5% moisture | Free from air and 1.5% moisture | Free from air and 3.5% moisture | With air and 0.5% moisture |
| Non-thermally upgraded paper | A (h$^{-1}$) | 4.1 × 10$^{10}$ | 1.5 × 10$^{11}$ | 4.5 × 10$^{11}$ | 4.6 × 10$^5$ |
| | $E_A$ (kJ/mol) | 128 | 128 | 128 | 89 |
| Thermally upgraded paper | A (h$^{-1}$) | 1.6 × 10$^4$ | 3.0 × 10$^4$ | 6.1 × 10$^4$ | 3.2 × 10$^4$ |
| | $E_A$ (kJ/mol) | 86 | 86 | 86 | 82 |

In Equation [7], the following quantities are used: $DP_{end}$ is the degree of polymerization of the insulating paper at the end-of-life of the transformer (estimated at 200), $DP_{start}$ is the initial degree of polymerization of the insulating paper of the transformer (estimated at 1100), A is the environmental factor in 1/h, EA is the activation energy in KJ/mol, t is the life of the transformer in hours, R is the gas constant in J/(K-mol) and $\theta_h$ is the hot spot temperature.

Figure 13B:
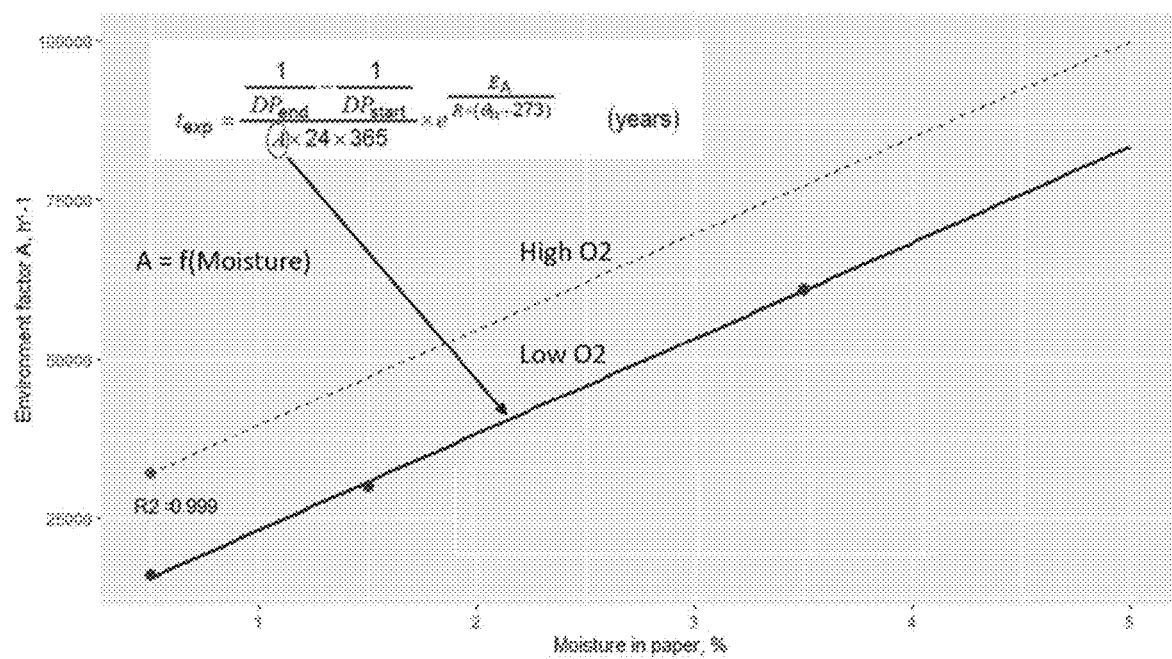
FIG. 13B is a graph of the environment factor (A) as a function of moisture level in the transformer.

It will be appreciated that the curves shown in FIG. 13A are for discrete levels of moisture only. According to some embodiments, these curves may be interpolated to obtain a continuous relationship between moisture content of the insulating paper and the environment factor A, as shown in FIG. 13B. That is, the curves can be interpolated to obtain A as a function of moisture in the insulating paper. From this data, a family of curves can be generated showing the expected life of a transformer as a function of moisture. The transformer monitoring system can make use of the measurement of moisture and dissolved oxygen in oil to estimate moisture in paper insulation or make use of reported data range in literature to probabilistically account for presence of moisture and oxygen in paper and create suitable curves described above and thereby consider these factors (moisture, oxygen) in the assessment of remnant life of the transformer.

Figure 14A:
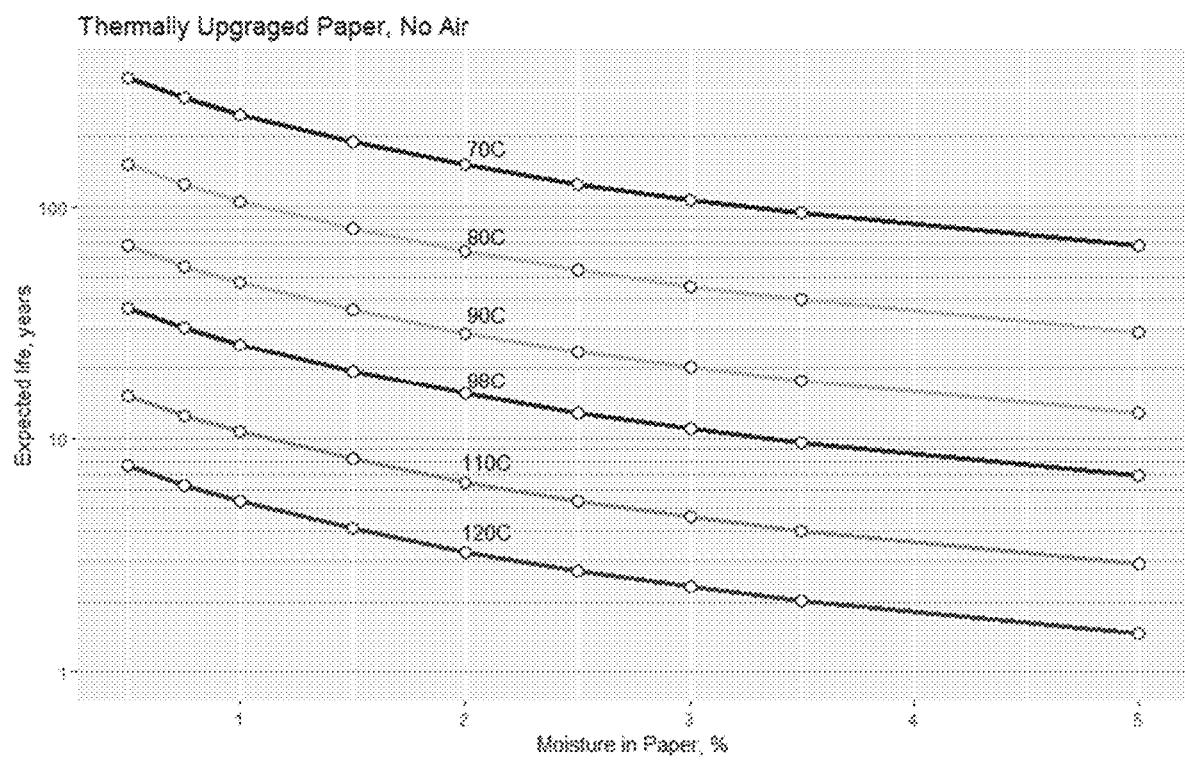
FIG. 14A is a graph that illustrates dependence of expected transformer life on moisture level in the transformer.

The dependence of expected life on moisture in the transformer can be seen in the graph of FIG. 14A, which shows expected life as a function of moisture levels in the solid insulation of a transformer for various hot spot temperatures for thermally upgraded paper.

Figure 14B:
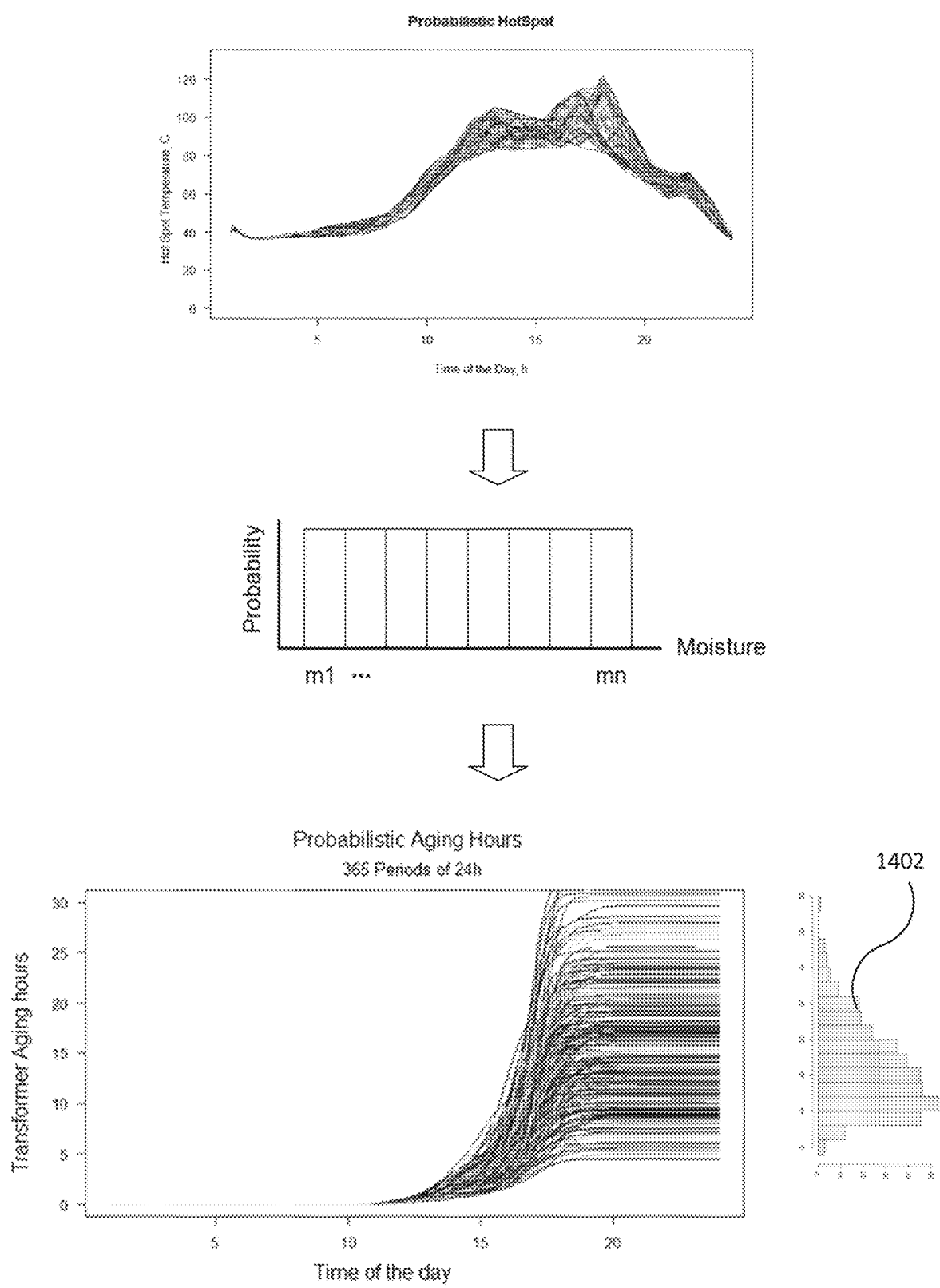
FIG. 14B illustrates probabilistic aging profiles generated using probabilistic hot spot data combined with probabilistic moisture data.

Referring to FIG. 14B, a probabilistic model of moisture in a transformer can be generated by assuming a uniform distribution of moisture probabilities within the limits that is derived from the measurements made for the transformer or likely to be observed for a particular type of the transformer. By simulating a number of probabilistic aging profiles based on the probabilistic hot spot profiles shown in FIG. 8 along with the probabilistic moisture levels, a histogram 1402 of transformer aging that takes into account moisture in the transformer may be generated, as shown in FIG. 14B. It will be appreciated that if actual distributions of moisture probabilities are known, such distributions can be used instead of the uniform distribution.

Figure 15:
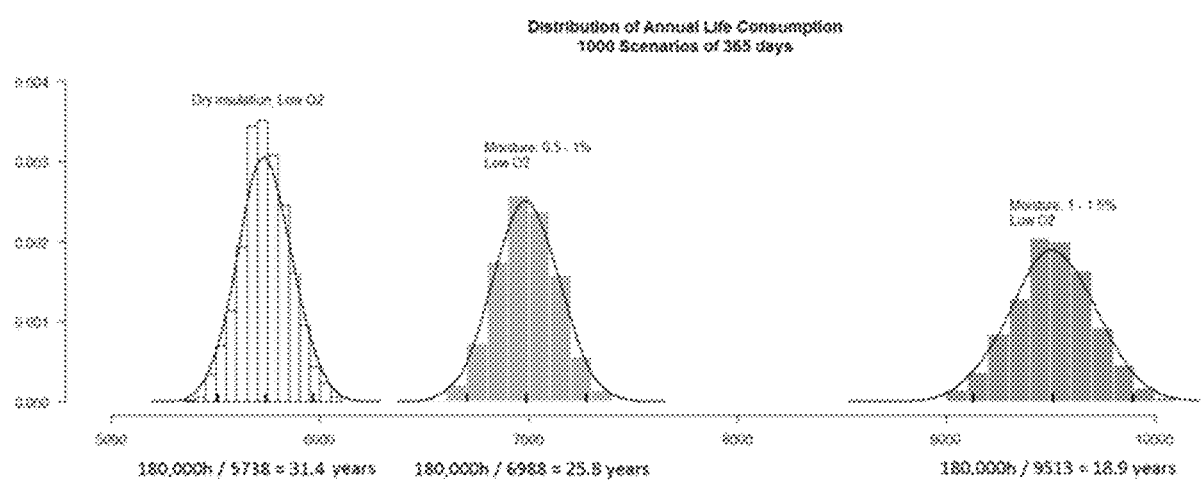
FIG. 15 illustrates histograms of one-year aging profiles for different moisture contents.

Accordingly, the moisture and oxygen content relationship can be added to the expected life estimation procedure described above, resulting in different expected effective aging profiles. The results of simulating 1000 365-day scenarios are shown in FIG. 15. As shown therein, different effective aging profiles are generated for different levels of moisture and oxygen in the transformer.

Figure 16:
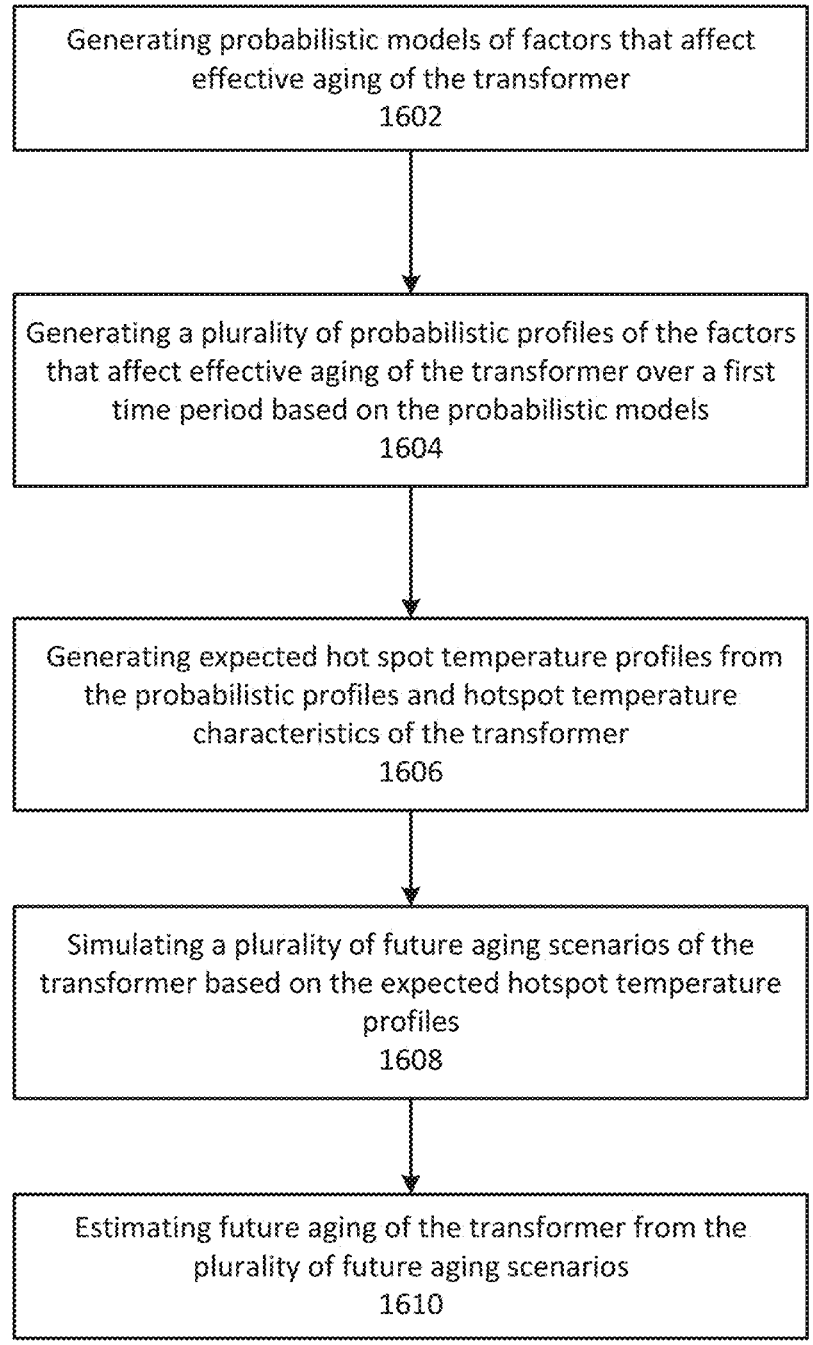
FIG. 16 is a flowchart of operations according to some embodiments.

Operations of systems/methods according to some embodiments are illustrated in FIG. 16. As shown therein, a method of estimating future aging of a transformer includes generating probabilistic models of factors that affect effective aging of the transformer (block 1602), generating probabilistic profiles of the factors that affect aging of the transformer (block 1604), generating expected hot spot profiles from the probabilistic profiles (block 1606), simulating a plurality of future life scenarios of the transformer based on the expected hot spot profiles (block 1608), and estimating effective aging of the transformer from the plurality of future life scenarios (block 1610).

The factors affecting the effective aging of the transformer may include one or more of factors such as load conditions, ambient temperature, moisture levels inside the transformer and oxygen levels inside the transformer. The plurality of future life scenarios may be simulated using a Monte Carlo simulation of future life scenarios. Monte Carlo simulation is a technique are used to model the probability of different outcomes in a process that can be predicted considering statistical variations observable in the variables involved in the system. In a Monte Carlo simulation, random samples of system parameters are generated and provided as an input into a complex system or process or its model, and the resulting outcome is measured/determined. This process is repeated many times with different randomly selected inputs, and information about the system or process can be gleaned by examining statistical parameters of the outputs. In various embodiments, Monte Carlo simulation is used to perform large number of simulation to account large number of possible conditions (for e.g. season/environmental changes) and possible values of the factors (e.g. electrical load, moisture levels, oxygen levels) that may result in a transformer (transformer conditions) in its life time, and thus consider these variations in estimation of ageing factor and remnant life of the transformer. The probabilistic models derived from history data (gathered from the one or more means such as measurement data gathered from the transformer, behaviors curves/data ranges provided in literature, use of an established mathematical formulae) are used for simulation of various environmental and transformer conditions. Such conditions for simulation are being referred to as future life scenarios for estimation of aging factors and remnant life (remaining life) of the transformer with better statistical confidence.

Figure 17:
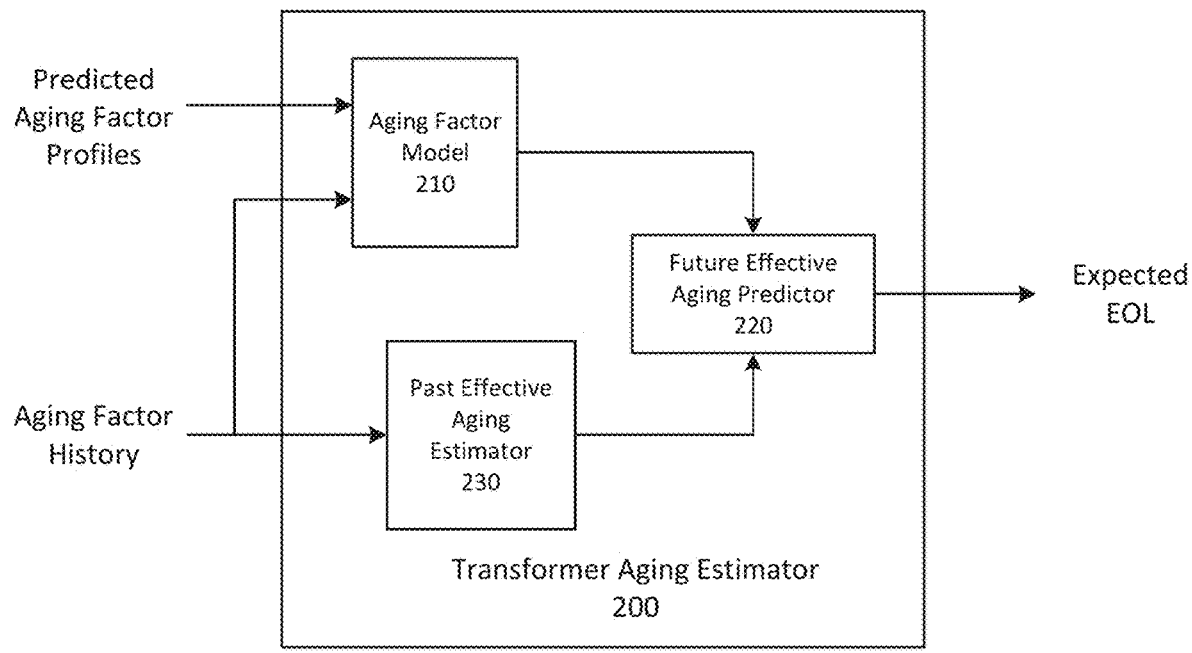
FIG. 17 is a functional block diagram of a transformer aging estimator.
Figure 18:
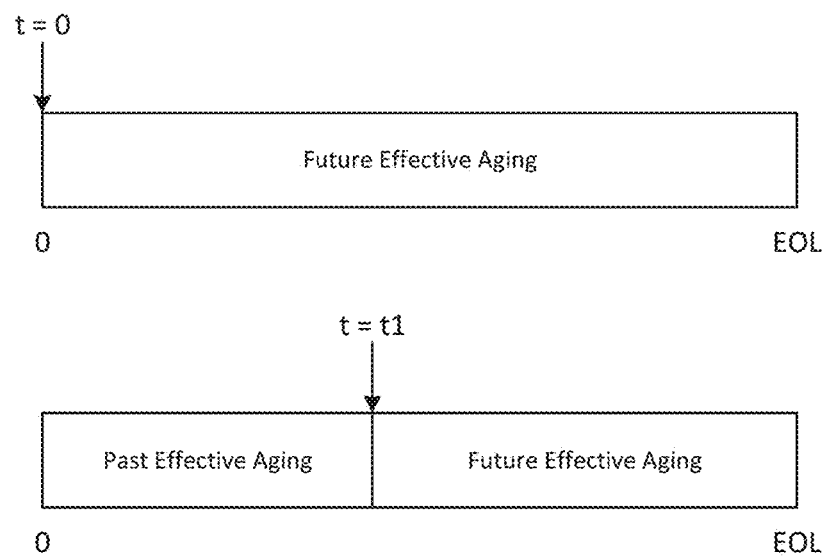
FIG. 18 illustrates estimation of remaining life of a transformer.

FIG. 17 illustrates a system for generating an estimate of the remaining life of a transformer. Such estimate, referred to as an End-of-Life (EOL) estimate may be generated according to some embodiments at the beginning of the life of the transformer based on predicted/expected aging factors, such as expected variations in ambient temperature and/or operational load, or any time during the operational life of the transformer. For example, as shown in FIG. 18, an estimate of the EOL may be made at the beginning of the life of the transformer (t=0), or at a time t1 between t=0 and the EOL of the transformer. At any given time t, the estimate of remaining life of the transformer is based on a combination of estimated effective aging up to time t and a prediction of the future effective aging of the transformer between time t and the EOL of the transformer. The estimated effective aging of the transformer up to time t may be based on known or estimated aging factors, such as known loads and ambient temperature variations up to time t. The prediction of future effective aging of the transformer between time t and EOL is based on predicted/expected aging factors.

The predicted/estimated aging factors may be based on known past values of the aging factors. For example, at the beginning of a transformer's life, the EOL estimate is formed entirely of a prediction of effective aging of the transformer in the future based on models of expected ambient temperature and operational load variations. As the transformer is operated, data may be recorded that reflects actual ambient temperature and operational load variations experienced by the transformer. The models of expected ambient temperature and operational load variations used to estimate future effective aging may be updated using the recorded data, which may improve the accuracy of the EOL estimate over time.

Referring again to FIG. 17, a transformer aging estimator 200 includes a past effective aging estimator 230 that generates an estimate of the past effective aging of the transformer based on actual or estimated aging factor history of the transformer, e.g., the actual or estimated ambient temperatures and operational loads experienced by the transformer up to that point. The transformer aging estimator 200 also includes a future effective aging predictor 220 that generates a prediction of the remaining life of the transformer based on the estimate of past aging of the transformer and a prediction of future aging of the transformer. The prediction of future aging of the transformer is based on an aging factor model that may take into account both predicted aging factor profiles (e.g., historical or average ambient temperature and/or operational load profiles) and actual aging factor data for the transformer in question.

For example, at the beginning of life of a transformer with a nominal life of 180,000 hours, the past effective aging estimator 230 would generate a past effective age of 0 hours. The future effective aging predictor 220 would generate an EOL estimate based only on an aging factor model that takes into account only predicted aging factor profiles.

At some later time in the transformer's life (e.g., at t=t1), the past effective aging estimator 230 would generate an estimate of the past effective age of the transformer, for example, based on the actual ambient temperatures and loads experienced by the transformer. In one example, the past effective aging estimator 230 may generate an effective age of the transformer of 100,000 hours. To determine an EOL estimate, the future effective aging predictor 220 generates a prediction of a number of effective aging hours the transformer will experience per year based on predicted aging factor profiles. Continuing with the example, the future effective aging predictor 220 may determine that the transformer will (within a predetermined confidence) age at a rate of 6000 effective aging hours per year based on predicted aging factors (ambient temperature, load, moisture content, oxygen content, etc.) The remaining expected life of the transformer is calculated as 180,000−100,000=80,000 hours. This quantity is divided by the effective aging rate determined by the future effective aging predictor 220 to generate a value of 80,000 (hours)/6,000 (hours/year)=13.33 years until EOL.

Figure 19:
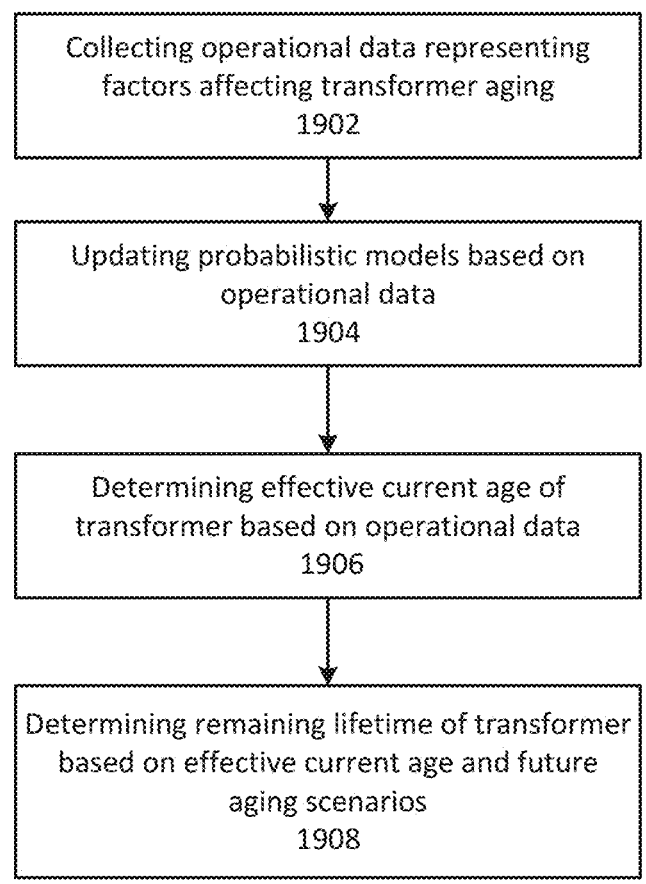
FIG. 19 is a flowchart of operations according to some embodiments.

FIG. 19 is a flowchart of operations of a transformer aging estimator 200 according to some embodiments. The method includes collecting (block 1902) operational data representing factors that affect effective aging of the transformer during operation of the transformer, and updating (1904) the probabilistic models of the factors that affect effective aging of the transformer.

The method further includes determining (block 1906) an effective current age of the transformer based on the operational data. The expected remaining life of the transformer is estimated from the plurality of future aging scenarios, from the effective current age of the transformer and a nominal expected life of the transformer. Accordingly, the method includes determining (block 1908) a remaining life of transformer based on effective current age and future aging scenarios.

Figure 20A:
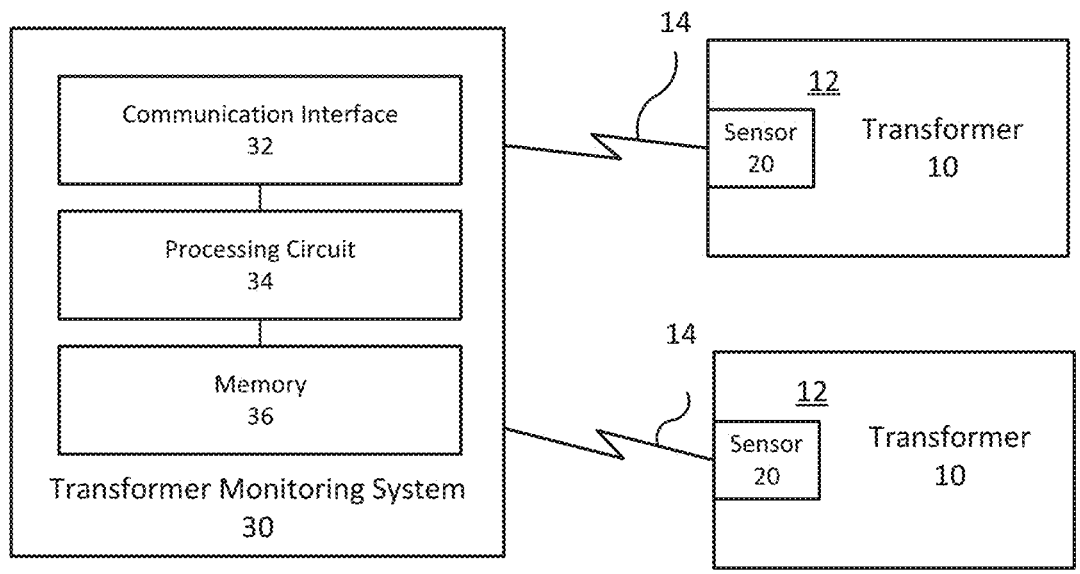
FIG. 20A is a block diagram illustrating a system for performing dissolved gas analysis according to some embodiments.

FIG. 20A is a block diagram of a transformer monitoring system 30 for estimating the end of life (EOL) of a transformer and transformers 10A and 10B. A transformer monitoring system 30 according to some embodiments can monitor one or multiple transformers 10A, 10B. In some embodiments, the transformer monitoring system 30 is integrated within a transformer 10A provided as a device for monitoring and life assessment, while in other embodiments, the transformer monitoring system 30 is separate from the transformers 10A, 10B being monitored.

The transformer monitoring system 30 includes a processor circuit 34 a communication interface 32 coupled to the processor circuit, and a memory 36 coupled to the processing circuit 34. The memory 36 includes machine-readable computer program instructions that, when executed by the processor circuit, cause the processor circuit to perform some of the operations depicted described herein. For example, the transformer monitoring system 30 may perform operations of the transformer aging estimator 200.

As shown, the transformer monitoring system 30 includes a communication interface 32 (also referred to as a network interface) configured to provide communications with other devices, e.g., with sensors 20 in the transformers 10A, 10B via a wired or wireless communication channel 14.

The transformer monitoring system 30 also includes a processing circuit 34 (also referred to as a processor) and a memory 36 (also referred to as memory) coupled to the processing circuit 34. According to other embodiments, processing circuit 34 may be defined to include memory so that a separate memory circuit is not required.

As discussed herein, operations of the transformer monitoring system 30 may be performed by processing circuit 34 and/or communication interface 32. For example, the processing circuit 34 may control the communication interface 32 to transmit communications through the communication interface 32 to one or more other devices and/or to receive communications through network interface from one or more other devices. Moreover, modules may be stored in memory 36, and these modules may provide instructions so that when instructions of a module are executed by processing circuit 34, processing circuit 34 performs respective operations (e.g., operations discussed herein with respect to example embodiments).

The transformer 10A, 10B, which may for example be a high voltage transformer, includes an oil-filled chamber 12. A sensor 20 is provided within or adjacent the oil-filled chamber 12. The sensor 20 measures various quantities associated with the transformer 10A, 10B such as operating load, ambient temperature, moisture and/or oxygen content, and transmits the measurements via communication channel 14 to the transformer monitoring system 30. The communication channel 14 may include a wired or wireless link, and in some embodiments may include a wireless local area network (WLAN) or cellular communication network, such as a 4G or 5G communication network.

The transformer monitoring system 30 may receive on-line or off-line measurements of operating load, temperature, moisture and/or oxygen content from the transformer 10A, 10B and process the measurements to determine an expected EOL of the transformer 10A, 10B. Although depicted as a standalone device, the transformer monitoring system 30 may be implemented in a server, in a server cluster and/or a cloud-based remote server system that provides asset monitoring. Measurement data may be obtained by the transformer monitoring system 30 from one transformer and/or from multiple transformers.

A transformer monitoring system 30 as described herein may be implemented in many different ways. For example, a transformer monitoring system 30 according to some embodiments may receive online/offline data, and the received data used by a machine learning technique configured in the device for learning and classification to identify different behavioral patterns (e.g. transformer parameters relating to seasons, electrical load or with time) that can be considered for estimation/simulations described in various embodiments. The device may be connectable to one or more transformers 10 to receive measurement data.

In some embodiments, the transformer monitoring system 30 may be connectable to receive measurement data relating to several transformers 10.

Figure 20B:
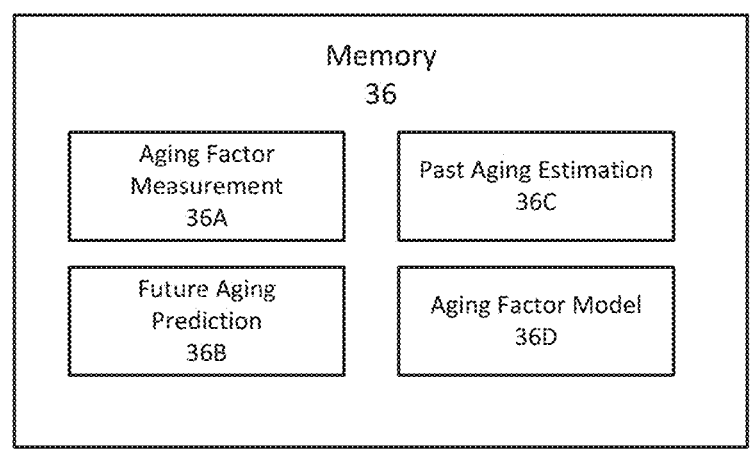
FIG. 20B is a block diagram illustrating functional modules of a system for performing dissolved gas analysis according to some embodiments.

FIG. 20B illustrates various functional modules that may be stored in the memory 36 of the transformer monitoring system 30. The modules may include an aging factor measurement module 36A for obtaining measurements from a sensor 20 in the transformer 10 via the communication interface 32, a future aging prediction module 36B that generates an estimate of future effective aging of the transformer, a past aging estimation module 36C that generates an estimate of past aging of the transformer, for example, based on actual aging factors experienced by the transformer, and an aging factor model 36D that estimates future aging factor profiles.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A method of generating an expected remaining lifetime of a transformer, comprising:
   generating probabilistic models of factors that affect effective aging of the transformer;
   generating a plurality of probabilistic profiles of the factors that affect effective aging of the transformer based on the probabilistic models;
   generating a plurality of probabilistic hot spot profiles from the plurality of probabilistic profiles and hot spot temperature characteristics of the transformer;
   simulating a plurality of future aging scenarios of the transformer based on the probabilistic hot spot profiles; and
   estimating an expected remaining lifetime of the transformer from the plurality of future aging scenarios.

2. The method of claim 1, wherein the plurality of probabilistic profiles are generated for a first time period, and wherein the future aging scenarios are generated over a second time period that is different from the first time period.

3. The method of claim 2, wherein simulating the plurality of future aging scenarios comprises:
   generating a plurality of aging profiles that simulate aging of the transformer over the first time period;
   for each of the plurality of aging profiles, estimating an effective aging amount of the transformer to provide a plurality of effective aging amounts; and
   summing the plurality of effective aging amounts to provide an estimated effective aging amount over the second time period.

4. The method of claim 3, wherein the first time period comprises a 24-hour time period and the second time period comprises a one-year time period.

5. The method of claim 1, wherein the factors affecting the effective aging of the transformer comprise load conditions, ambient temperature, moisture levels inside the transformer and/or oxygen levels inside the transformer.

6. The method of claim 1, wherein simulating the plurality of future aging scenarios comprises performing a Monte Carlo simulation of future aging scenarios based on the plurality of probabilistic hot spot profiles.

7. The method of claim 1, wherein generating probabilistic profiles of factors that affect the effective aging of the transformer comprises generating a plurality of ambient temperature profiles based on historical variations in ambient temperature.

8. The method of claim 7, wherein the ambient temperature profiles describe expected ambient temperatures over a predetermined time period.

9. The method of claim 8, further comprising generating the ambient temperature profiles based on probability distributions of ambient temperature at a plurality of intervals within the predetermined time period.

10. The method of claim 9, wherein the probability distributions comprise uniform probability distributions.

11. The method of claim 9, wherein the probability distributions comprise probability distributions generated based on actual ambient temperature data.

12. The method of claim 1, wherein generating probabilistic profiles of factors that affect the effective aging of the transformer comprises generating a plurality of expected load profiles based on predicted loading of the transformer.

13. The method of claim 12, wherein the expected load profiles describe expected loads over a predetermined time period.

14. The method of claim 13, further comprising generating the expected load profiles based on probability distributions at a plurality of time intervals within the predetermined time period.

15. The method of claim 14, wherein the probability distributions comprise uniform probability distributions.

16. The method of claim 14, wherein the probability distributions comprise estimates of actual probability distributions of the expected load.

17. The method of claim 1, wherein estimating future aging of the transformer from the plurality of future aging scenarios comprises generating a histogram of simulated future aging scenarios; and
generating a confidence interval of an expected remaining life of the transformer based on the histogram of simulated future aging scenarios and associated mean and standard deviation of a distribution of the simulated future aging scenarios.

18. The method of claim 17, wherein the future aging scenarios comprise expected annual aging scenarios, the method further comprising generating an estimate of the expected remaining life of the transformer based on a nominal expected life of the transformer and the expected annual aging scenarios.

19. The method of claim 1, further comprising:
collecting operational data representing factors that affect effective aging of the transformer during operation of the transformer; and
updating the probabilistic models of the factors that affect effective aging of the transformer.

20. The method of claim 19, further comprising:
determining an effective current age of the transformer based on the operational data;
wherein the expected remaining life of the transformer is estimated from the plurality of future aging scenarios, from the effective current age of the transformer and a nominal expected life of the transformer.

21. The method of claim 1, wherein the probabilistic models comprise probability distributions of the factors that affect aging of the transformer.

22. The method of claim 1, wherein the factors that affect aging of the transformer comprise ambient temperature and load, and wherein the probabilistic models comprise uniform probability distributions.

23. The method of claim 1, further comprising performing maintenance on the transformer and/or adjusting a load of the transformer based on the estimated future aging of the transformer.

24. A method of estimating an expected remaining life of a transformer based on probabilistic models of factors that affect aging of the transformer, the method comprising:
collecting operational data representing the factors that affect effective aging of the transformer during operation of the transformer;
updating the probabilistic models of the factors that affect effective aging of the transformer based on the operational data; and
determining an effective current age of the transformer based on the operational data;
wherein the expected remaining life of the transformer is estimated from a plurality of future aging scenarios generated based on the probabilistic factors, from the effective current age of the transformer and from a nominal expected life of the transformer.

25. The method of claim 24, wherein collecting the operational data comprises collecting the operational data from a sensor in the transformer.

26. The method of claim 24, wherein the factors affecting the effective aging of the transformer comprise load conditions, ambient temperature, moisture levels inside the transformer and/or oxygen levels inside the transformer.

27. A device for estimating future aging of a transformer, comprising:
a processing circuit; and
a memory coupled to the processing circuit, wherein the memory stores computer program instructions that, when executed by the processing circuit, cause the device to perform operations comprising:
generating probabilistic models of factors that affect effective aging of the transformer;
generating a plurality of probabilistic profiles of the factors that affect effective aging of the transformer over a first time period based on the probabilistic models;
generating expected hot spot profiles from the probabilistic profiles and hot spot temperature characteristics of the transformer;
simulating a plurality of future aging scenarios of the transformer based on the expected hot spot profiles over a second time period; and
estimating future aging of the transformer from the plurality of future aging scenarios.

28. The device of claim 27, wherein the factors affecting the effective aging of the transformer comprise load conditions, ambient temperature, moisture levels inside the transformer and/or oxygen levels inside the transformer.

* * * * *